(12) United States Patent
Onozato et al.

(10) Patent No.: US 11,900,727 B2
(45) Date of Patent: Feb. 13, 2024

(54) INFORMATION PROCESSING DEVICE

(71) Applicant: NEC Corporation, Tokyo (JP)

(72) Inventors: Muneaki Onozato, Tokyo (JP); Satoshi Terasawa, Tokyo (JP); Yusuke Konishi, Tokyo (JP); Kenta Ishihara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 226 days.

(21) Appl. No.: 17/422,296

(22) PCT Filed: Jan. 18, 2019

(86) PCT No.: PCT/JP2019/001466
§ 371 (c)(1),
(2) Date: Jul. 12, 2021

(87) PCT Pub. No.: WO2020/148891
PCT Pub. Date: Jul. 23, 2020

(65) Prior Publication Data
US 2022/0076001 A1   Mar. 10, 2022

(51) Int. Cl.
G06V 40/16 (2022.01)
G06V 20/30 (2022.01)
G06V 40/20 (2022.01)
G06V 20/52 (2022.01)

(52) U.S. Cl.
CPC ............ *G06V 40/173* (2022.01); *G06V 20/30* (2022.01); *G06V 20/53* (2022.01); *G06V 40/23* (2022.01)

(58) Field of Classification Search
CPC ...... G06V 40/173; G06V 20/30; G06V 20/53; G06V 40/23
USPC .......................................................... 382/115
See application file for complete search history.

(56) References Cited

U.S. PATENT DOCUMENTS

2007/0189585 A1* 8/2007 Sukegawa ............... G07C 9/37
382/118

FOREIGN PATENT DOCUMENTS

| JP | 2007-249953 A | 9/2007 |
| JP | 2011-081735 A | 4/2011 |
| TW | 200623873 A | 7/2006 |

OTHER PUBLICATIONS

International Search Report for PCT Application No. PCT/JP2019/001466, dated Apr. 2, 2019.
Taiwanese Office Action for TW Application No. 109100693 dated Feb. 7, 2022 with English Translation.

* cited by examiner

*Primary Examiner* — Ayodeji O Ayotunde
(74) *Attorney, Agent, or Firm* — Sughrue Mion, PLLC

(57) ABSTRACT

An information processing device according to the present invention includes a person extraction means that extracts a person in a captured image, an action extraction means that extracts an action of a person group including a plurality of persons other than a given person in the captured image, and an identification means that identifies a given person group based on a result of extraction of the action of the person group.

14 Claims, 19 Drawing Sheets

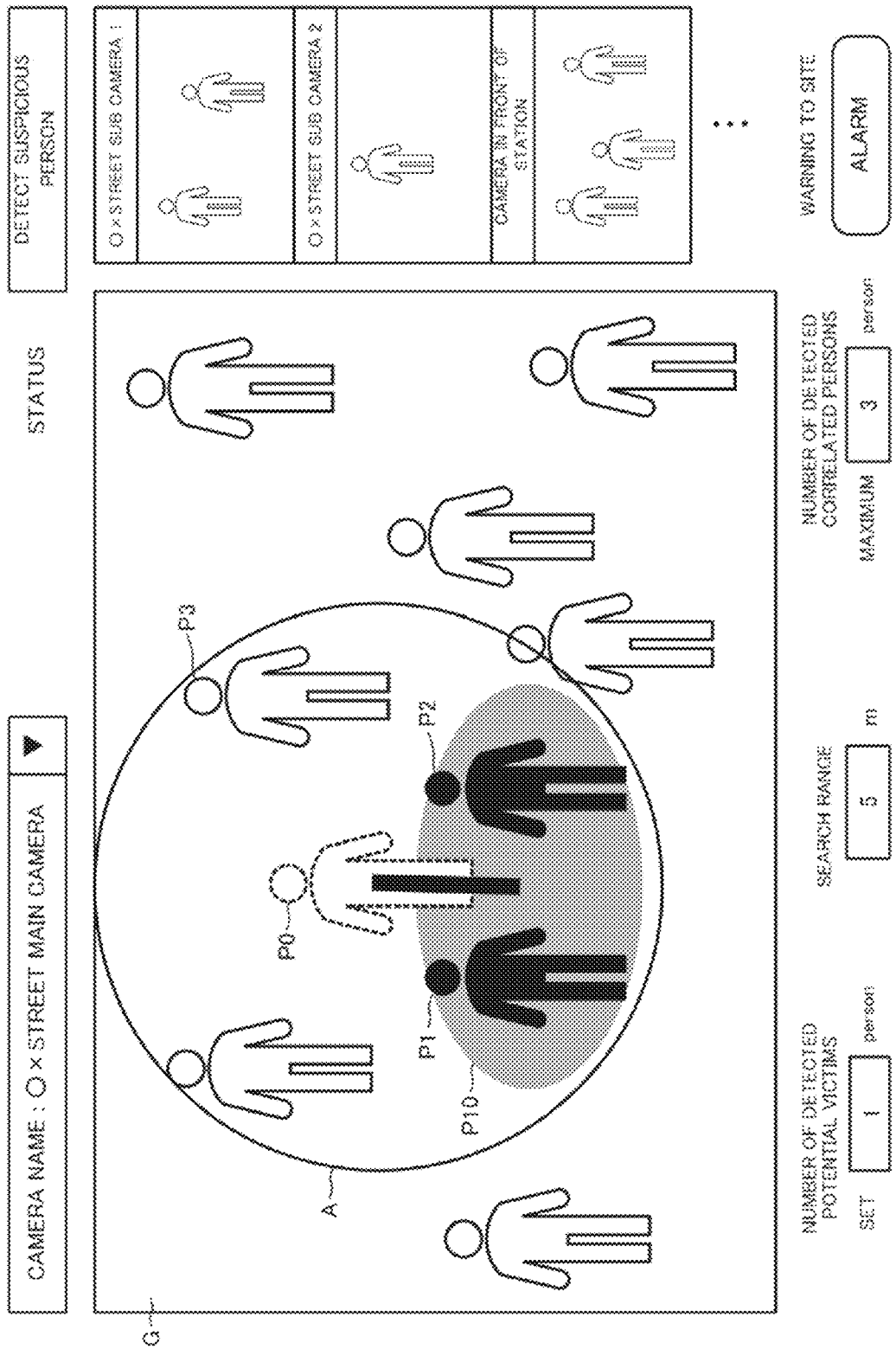

INFORMATION PROCESSING DEVICE

This application is a National Stage Entry of PCT/JP2019/001466 filed on Jan. 18, 2019, the contents of all of which are incorporated herein by reference, in their entirety.

TECHNICAL FIELD

The present invention relates to an information processing device that identifies a given person in a place where a plurality of persons exist, an information processing method, and a program.

BACKGROUND ART

In places where a large number of unspecified persons densely gather, such as an airport, a station, a store, an event venue and a tourist spot, a person who might commit a crime such as pickpocketing or snatching or a nuisance may exist. In order to prevent such a crime and a nuisance, it is desired to detect a person who might perform such an action.

Patent Document 1 describes a technique of monitoring a suspicious person in a monitoring area. To be specific, Patent Document 1 describes detecting a suspicious person in a monitoring area by using information such as the level of credibility of a person based on the result of authentication by an authentication device and the relevance to such a person.

Patent Document 1: Japanese Unexamined Patent Application Publication No. 2011-081735

However, in the technique of Patent Document 1 described above, there is a need to firstly recognize a highly credible known person. Such a person is hard to be recognized in a place where a large number of unspecified persons exist. As a result, there arises a problem that it is impossible to identify a desired person in a place where a plurality of persons exist.

SUMMARY OF THE INVENTION

Accordingly, an object of the present invention is to provide an information processing device which can solve the abovementioned problem that it is impossible to identify a desired person in a place where a plurality of persons exist.

An information processing device according to an aspect of the present invention includes: a person extraction means that extracts a person in a captured image; an action extraction means that extracts an action of a person group including a plurality of other persons against a given person in the captured image; and an identification means that identifies a given person group based on a result of extracting the action of the person group.

Further, a computer program according to another aspect of the present invention includes instructions for causing an information processing device to realize: a person extraction means that extracts a person in a captured image; an action extraction means that extracts an action of a person group including a plurality of other persons against a given person in the captured image; and an identification means that identifies a given person group based on a result of extracting the action of the person group.

Further, an information processing method according to another aspect of the present invention includes: extracting a person in a captured image; extracting an action of a person group including a plurality of other persons against a given person in the captured image; and identifying a given person group based on a result of extracting the action of the person group.

Further, an information processing device according to another aspect of the present invention includes: a person extraction means that extracts a person in a captured image; a target person detection means that extracts an attribute of a person in the captured image and detects a target person based on person information including the attribute of the person; an action extraction means that extracts an action of another person against the target person in the captured image; and an identification means that identifies a given other person based on a result of extracting the action of the other person.

Further, a computer program according to another aspect of the present invention includes instructions for causing an information processing device to realize: a person extraction means that extracts a person in a captured image; a target person detection means that extracts an attribute of a person in the captured image and detects a target person based on person information including the attribute of the person; an action extraction means that extracts an action of another person against the target person in the captured image; and an identification means that identifies a given other person based on a result of extracting the action of the other person.

Further, an information processing method according to another aspect of the present invention includes: extracting a person in a captured image; extracting an attribute of a person in the captured image and detecting a target person based on person information including the attribute of the person; extracting an action of another person against the target person in the captured image; and identifying a given other person based on a result of extracting the action of the other person.

With the configurations as described above, the present invention allows for identification of a desired person in a place where a plurality of persons exist.

BRIEF DESCRIPTION OF DRAWINGS

FIG. 13B is a view showing an example of information displayed on the output device disclosed in FIG. 1;

EXAMPLE EMBODIMENT

First Example Embodiment

A first example embodiment of the present invention will be described referring to FIGS. 1 to 14. FIGS. 1 to 13 are views for describing the configuration of an information processing system. FIG. 14 is a flowchart for describing a processing operation in the information processing system. [Configuration]

The information processing system according to the present invention is used for detecting a desired person based on a preset criterion from among persons P existing in a set target place R such as a store or a facility. In the following, it is assumed that the target place R is a "tourist spot", and a case will be described as an example where a "potential victim (given person, target person)" who can be a victim of a crime such as pickpocketing and a "suspicious person group (person group)" including a plurality of persons who may commit a crime are detected in the place R. However, in the present invention, the target place R may be any place, for example, a store or a facility such as a jewelry store, a game center, or an amusement park. Moreover, as will be described later, a person to be detected in the present invention is not limited to a potential victim or a suspicious person group, and may be a single suspicious person against a potential victim or, not limited to a suspicious person, may be any person that has a correlation to a certain person.

Further, the information processing system according to the present invention is also used for easily recognizing a person detected in the target place R as described above. For example, the information processing system displays and outputs a correlation between persons so that a monitoring person can easily recognize a detected potential victim and a detected suspicious person group. In the following, the configuration of the information processing system will be described in detail.

Figure 1:
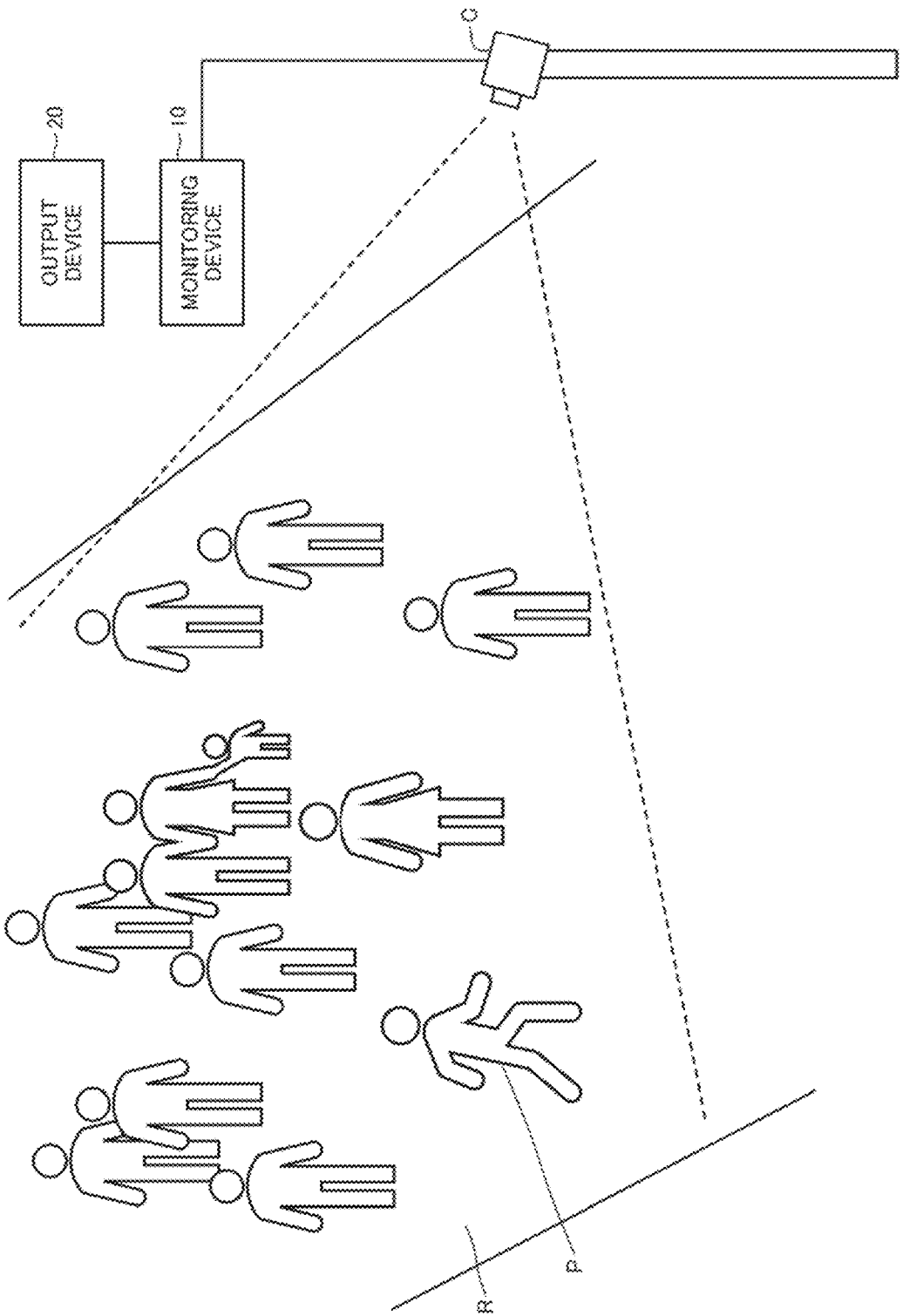
FIG. 1 is a view showing the entire configuration of an information processing system according to a first example embodiment of the present invention.

As shown in FIG. 1, the information processing system in this example embodiment includes a camera C for capturing an image of a space that is the target place R, a monitoring device 10 that monitors the persons P in a captured image, and an output device 20 that outputs a monitoring result. The monitoring device 10 is configured by one or a plurality of information processing devices each including an arithmetic logic unit and a storage unit. Moreover, the output device 20 is configured by one or a plurality of information processing devices each including an arithmetic logic unit and a storage unit, and further includes a display device. As will be described later, the display device is for displaying and outputting a detected person together with a captured image G captured by the monitoring device 10. Besides, not shown in the drawings, the person P may hold a mobile terminal. The mobile terminal is an information processing terminal such as a smartphone and, in the monitoring device 10, address information is registered and a face image of the person holding the terminal is also registered beforehand. In the following, the configuration of the monitoring device 10 will be described in detail.

Figure 2:
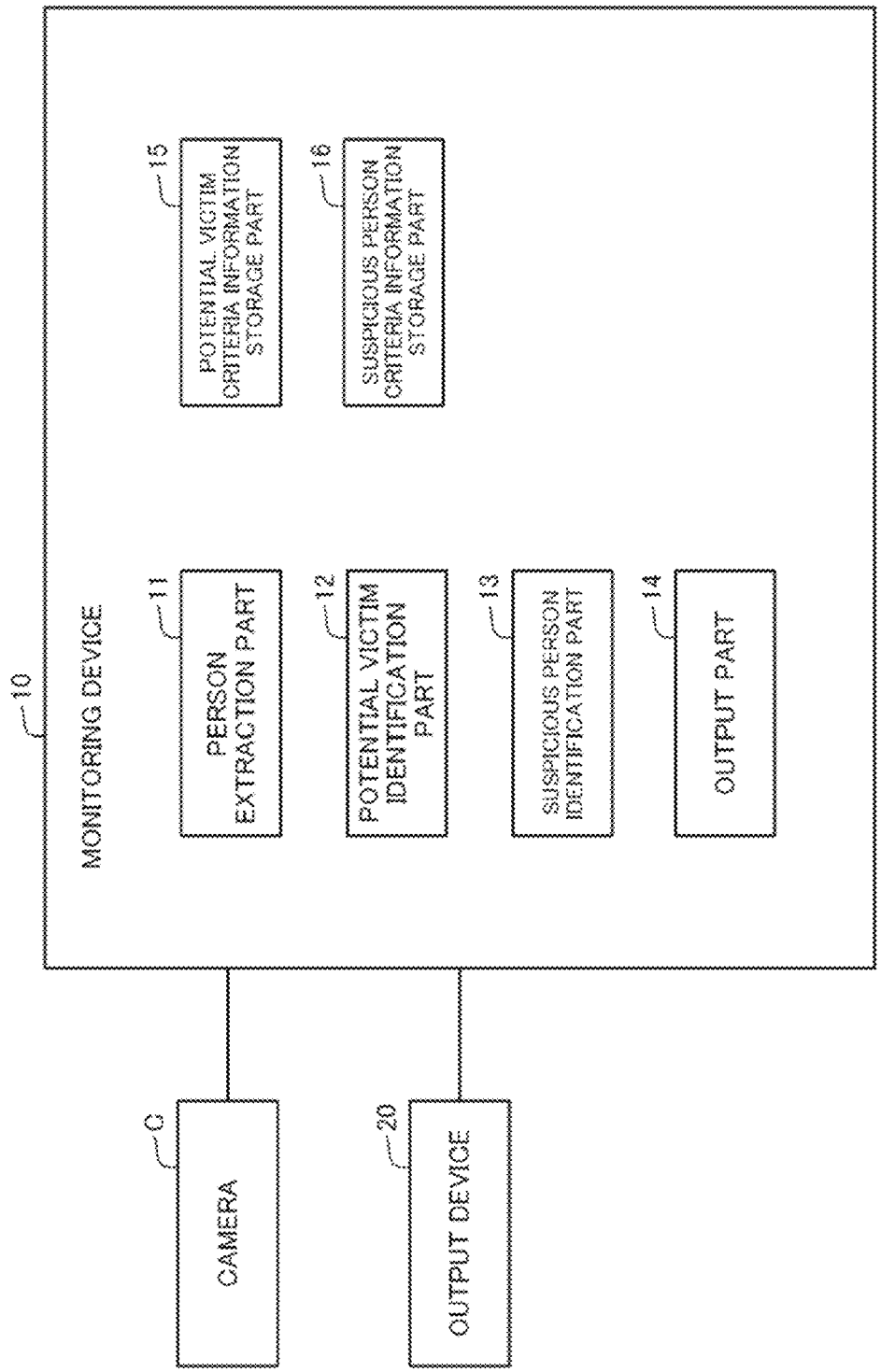
FIG. 2 is a block diagram showing the configuration of a monitoring device disclosed in FIG. 1.

As shown in FIG. 2, the monitoring device 10 includes a person extraction part 11, a potential victim identification part 12, a suspicious person identification part 13, and an output part 14 that are constructed by execution of a program by the arithmetic logic unit. Moreover, the monitoring device 10 includes a potential victim criteria information storage part 15 and a suspicious person criteria information storage part 16 that are formed in the storage unit.

Figure 4:
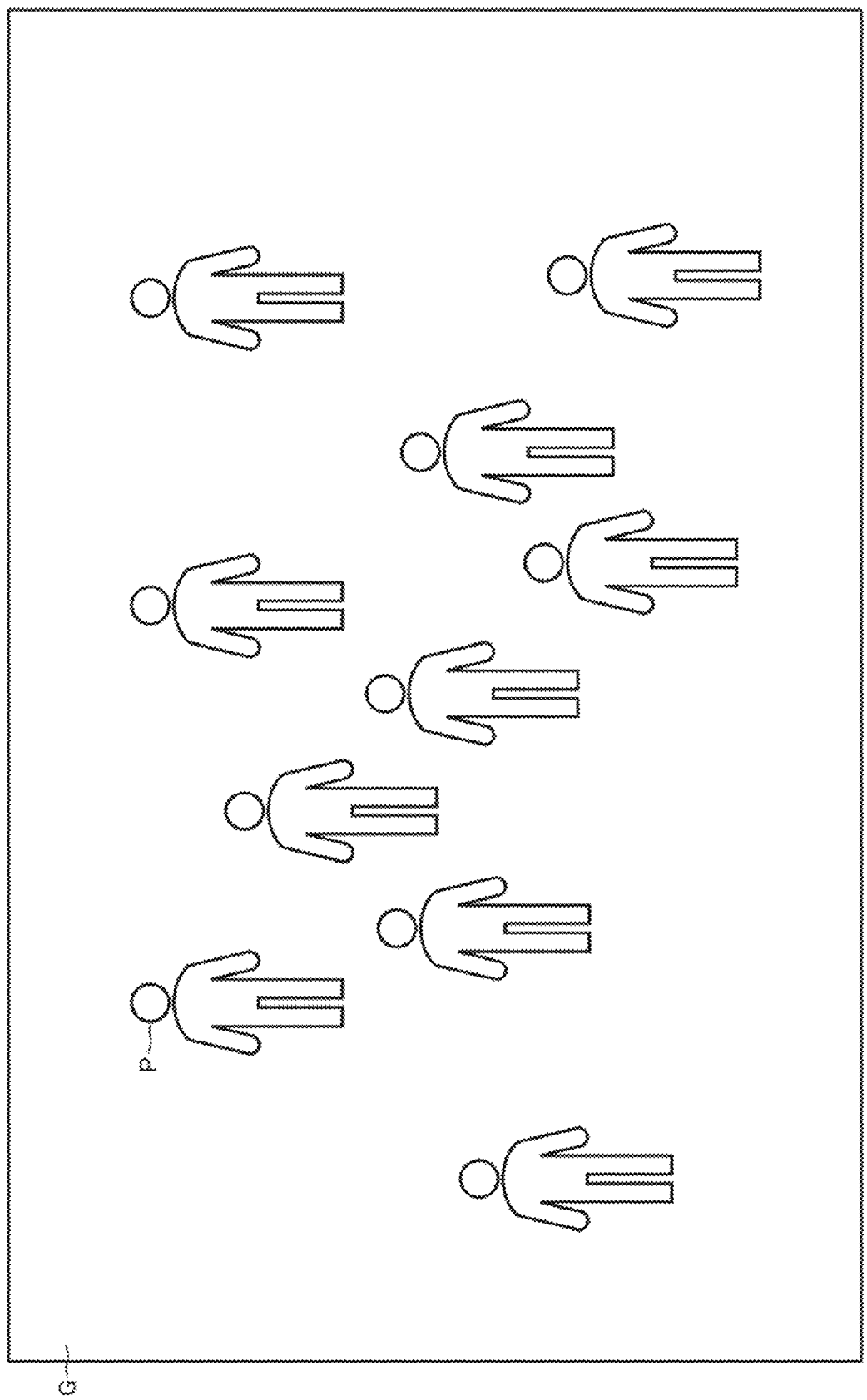
FIG. 4 is a view showing how processing on a captured image is performed by the monitoring device disclosed in FIG. 1.
Figure 5:
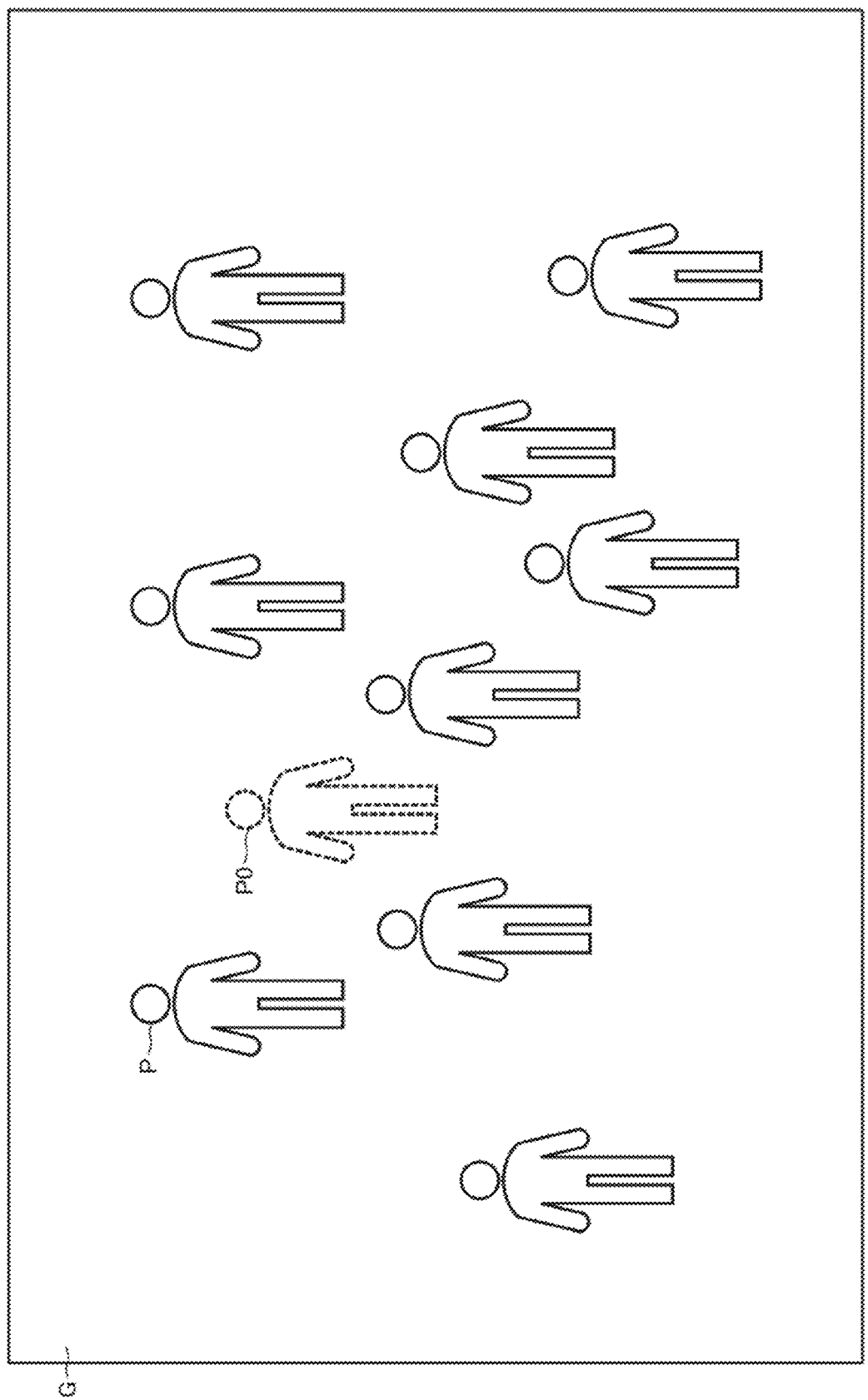
FIG. 5 is a view showing how processing on a captured image is performed by the monitoring device disclosed in FIG. 1.
Figure 6:
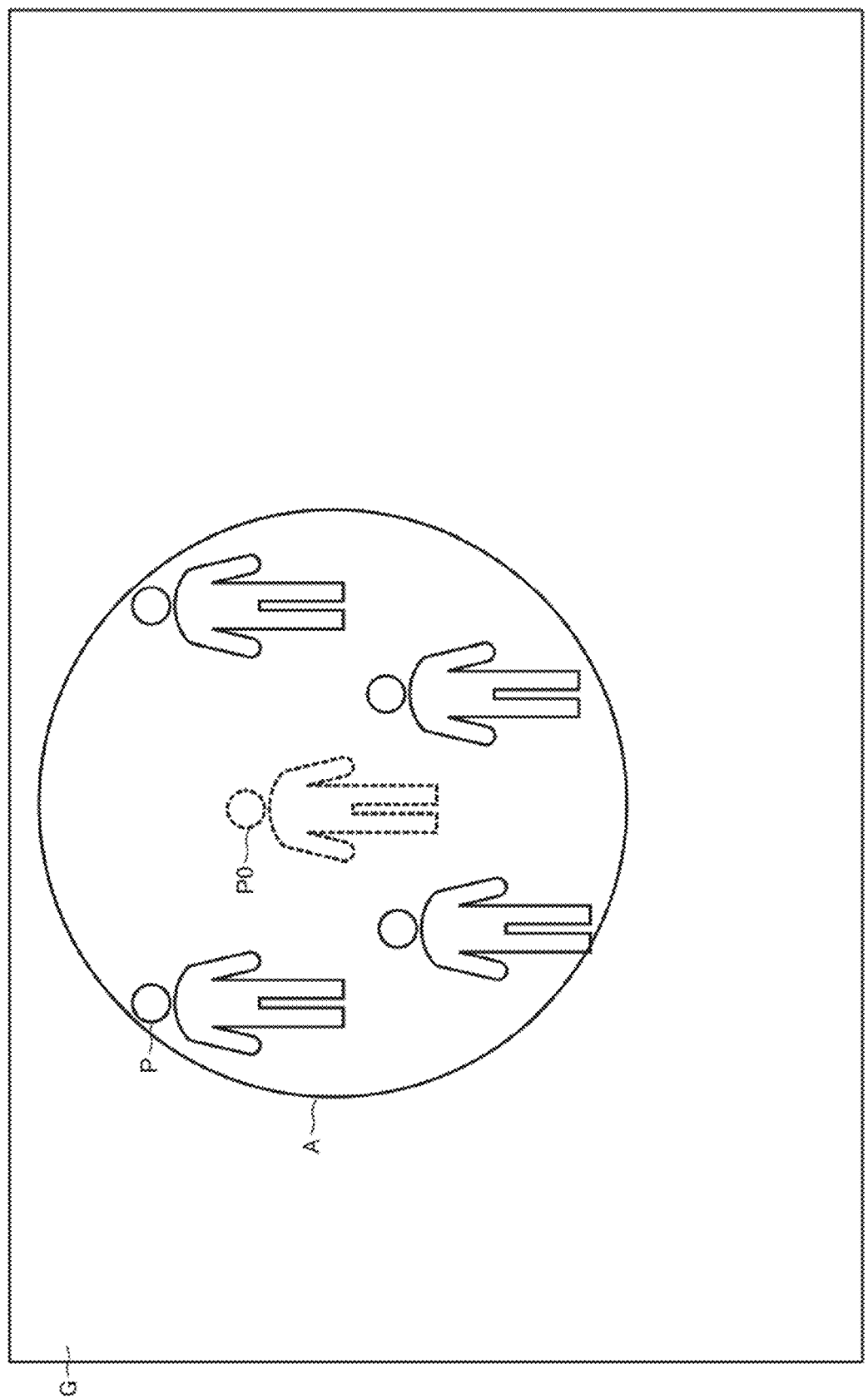
FIG. 6 is a view showing how processing on a captured image is performed by the monitoring device disclosed in FIG. 1.

First, the person extraction part 11 (person extraction means) accepts captured images of the target place R captured by the camera C at regular time intervals. For example, as shown in FIG. 4, the person extraction part 11 accepts the captured image G of the target place R where a plurality of persons P exist, and temporarily stores the image. Then, from the shape, color, motion and so on of an object shown in the captured image, the person extraction part 11 extracts the person P in the captured image.

Further, based on an image portion of the person P extracted from the captured image, the person extraction part 11 extracts person attribute information representing the attribute of the person P. The person attribute information is information representing, for example, the gender, age (generation), personal items such as clothes and bags of the person P, and is extracted by image analysis from a face image, a body image or the like of the person P. Moreover, the person extraction part 11 extracts the action of the person P in the captured image, and also includes the action in the person attribute information representing an attribute of the person. For example, the person extraction part 11 extracts a face direction, a face expression, a movement route, whether the person is alone or in a group, whether the person is walking, has stopped or is squatting, and so on, as the action of the person from a face image and a body image of the person, a distance between the person and another person, and so on.

Furthermore, the person extraction part 11 acquires environment information representing the surrounding environment of the target place R at the time of extracting the person attribute information for each person P as described above. For example, the person extraction part 11 acquires time and date, season, weather, temperature, and so on, as the environment information from another information processing device connected via a network. Alternatively, the person extraction part 11 may recognize and acquire environment information such as season, weather, and temperature, from various information such as the clothes and belongings of the plurality of persons P in the captured image, the brightness of the target place R obtained from the captured image, and a roadway, sidewalk, vehicle, bicycle and so on detected from the captured image. The person extraction part 11 may further recognize a person's action such as "walking near the roadway" or "squatting in front of the vehicle" from the combination of the action of the person P and the environmental information extracted as described above. Information representing such a person's action may be used as a potential victim model, which will be described later.

Then, the person extraction part 11 associates the extracted person attribute information and the extracted environment information with the captured image, and stores them into the potential victim criteria information storage part 15. The person extraction part 11 performs extraction of a person, extraction of person attribute information and acquisition of environment information as described above at all times on consecutively input captured images, and outputs the captured images and the extracted information to the potential victim identification part 12, the suspicious person identification part 13, and the output part 14.

The potential victim identification part 12 (criteria information generation means, target person generation means) firstly generates a potential victim model (criteria information) representing a model of a person to be detected as a potential victim, who is easy to become a victim, based on a past captured image. To be specific, by using a previously stored feature (including an attribute and an environment) of a person having been a victim of a crime such as pickpocketing in the past, the potential victim identification part 12 learns the person attribute information and the environment information that are stored in the potential victim criteria information storage part 15, and generates a potential victim model including the environment and the attribute of a person. For example, the potential victim identification part 12 generates a potential victim model that a person who is a woman and who acts alone and holds a shoulder bag on her shoulder on a dim day or evening time is set as a potential victim. A potential victim model is not necessarily limited to being generated by learning based on a past captured image, and may use prepared information. Besides, a potential victim model may set only the person attribute information as a condition without including the environment information, or may use any information.

Further, the potential victim identification part 12 detects a potential victim P0 from among the persons P in a current captured image. For this, firstly on a newly captured image, as described above, the person extraction part 11 extracts the person P from the captured image, extracts the person attribute information of the person P and the environment information, and sends the information to the potential victim identification part 12. Then, the potential victim identification part 12 compares the person attribute information and so on extracted from the newly captured image with the potential victim model stored in the potential victim criteria information storage part 15. In a case where the extracted person attribute information and so on agree with the potential victim model, the potential victim identification part 12 detects the person P as a potential victim. For example, as indicated by reference numeral P0 in FIG. 5, the potential victim identification part 12 detects the potential victim P0 who may become a victim from among the persons P in the target place R. As will be described late, the potential victim identification part 12 may detect any person in the captured image G as the potential victim P0r, without the potential victim model.

Then, the potential victim identification part 12 notifies position information in the captured image of the detected potential victim P0 to the suspicious person identification part 13 and the output part 14. The potential victim identification part 12 follows the potential victim P0 in newly captured image consecutively input after that, and notifies the position information to the suspicious person identification part 13 and the output part 14 at all times. Moreover, the potential victim identification part 12 detects another new potential victim P0 in the newly captured images. Although the potential victim identification part 12 detects a number of potential victims P0 set by the monitoring person as will be described later, the potential victim identification part 12 may detect a plurality of potential victims P0 at a time.

The suspicious person identification part 13 (action extraction means, identification means, correlation detection means) detects correlated persons who are correlated to the potential victim P0 from a newly captured image based on position information of the potential victim P0 notified by the potential victim identification part 12 described above, and identifies a suspicious person from among the correlated persons. As will be described later, the suspicious person identification part 13 may also detect correlated persons from a previously captured image and identify a suspicious person. To be specific, the suspicious person identification part 13 firstly extracts the action of another person P located in a given range with reference to the potential victim P0 from a captured image. For example, as indicated by reference symbol A in FIG. 6, the suspicious person identification part 13 sets a region with a given radius around the position of the potential victim P0 in the captured image, as a processing region, and extracts the action of another person (four persons in this example) located in the processing region A. The suspicious person identification part 13 sets a region with a radius around the position of the potential victim P0 set as a search region by the monitoring person as will be described later, as the processing region A, and extracts the action of a person.

Then, the suspicious person identification part 13 extracts the position of the other person with reference to the position of the potential victim P0 as information representing a person's action. With this, the suspicious person identification part 13 extracts a distance between the potential victim P0 and the other person, and a distance between a plurality of persons with reference to the potential victim P0. A specific example of extraction of a person's action by the suspicious person identification part 13 will be described referring to FIGS. 3 and 7.

Figure 7:
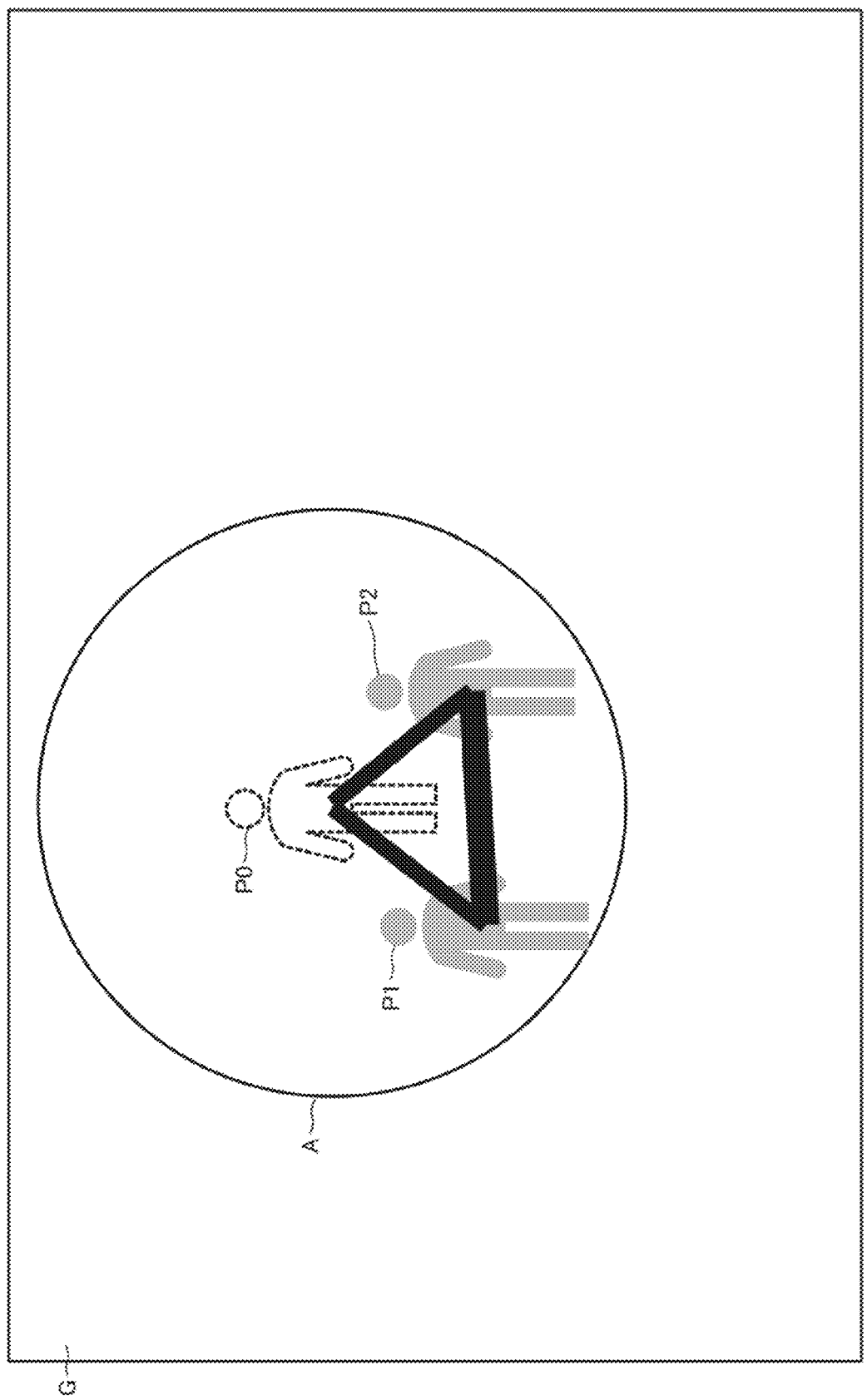
FIG. 7 is a view showing how processing on a captured image is performed by the monitoring device disclosed in FIG. 1.
Figure 8:
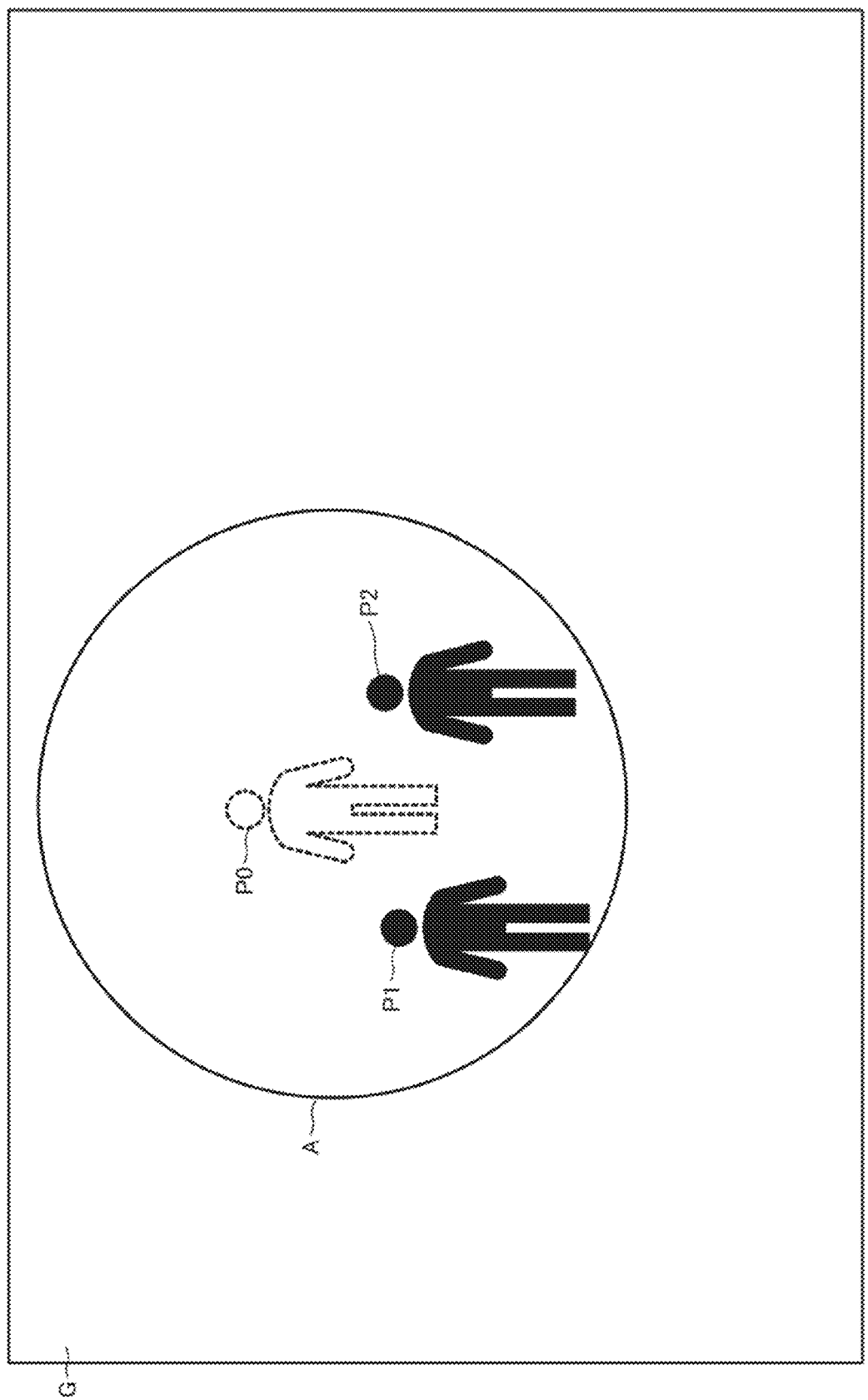
FIG. 8 is a flowchart showing how processing on a captured image is performed by the monitoring device disclosed in FIG. 1.

First, the suspicious person identification part 13 detects a correlated person who takes a related action to the potential victim P0. For example, as shown in FIG. 7, the suspicious person identification part 13 extracts persons who have given correlations to the potential victim P0 as correlated persons P1 and P2, as in a case where they are located within a given range of distance from the potential victim P0. In this example, a person group including two persons are extracted as correlated persons. The suspicious person identification part 13 extracts the actions of a number of correlated persons P1 and P2 set as the number of detected correlated persons by the monitoring person as will be described later. Then, the suspicious person identification part 13 checks whether or not the correlated persons P1 and P2 forming a person group take a mutually related action. For example, as shown in FIG. 7, the suspicious person identification part 13 extracts a distance between the correlated persons P1 and P2, and an action such as simultaneously stopping. Other actions to be extracted are actions that can be detected in time series; for example, the correlated persons P1 and P2 rapidly get close to each other, stretch their arms, gaze for a given time or more, walk at an almost equal distance for a predetermined time or more. The suspicious person identification part 13 constantly extracts position information of the respective correlated persons P1 and P2, a distance between the potential victim P0 and each of the correlated person P1 and P2, and a distance between the correlated persons P1 and P2 and their actions as the respective persons move, and stores and notifies to the output part 14.

Although a case where the suspicious person identification part 13 extracts the actions of the correlated persons P1 and P2, and so on, from a captured image after the position of the potential victim P0 is identified has been described above as an example, the suspicious person identification part 13 may extract the actions of the correlated persons P1 and P2, and so on, in the same manner as described above by using a captured image before the position of the potential victim P0 is identified. For example, the suspicious person identification part 13 may extract the actions of the correlated persons P1 and P2, and so on, in the same manner as described above, from captured images for a past predetermined time period since a moment when the position of the potential victim P0 has been identified, or from captured images reversely played for a predetermined time period. With this, for example, it is also possible to extract the correlated persons P1 and P2 who once came close to the potential victim P0 and, after identification of the position of the potential victim P0, have been located away from the potential victim P0.

Figure 3:
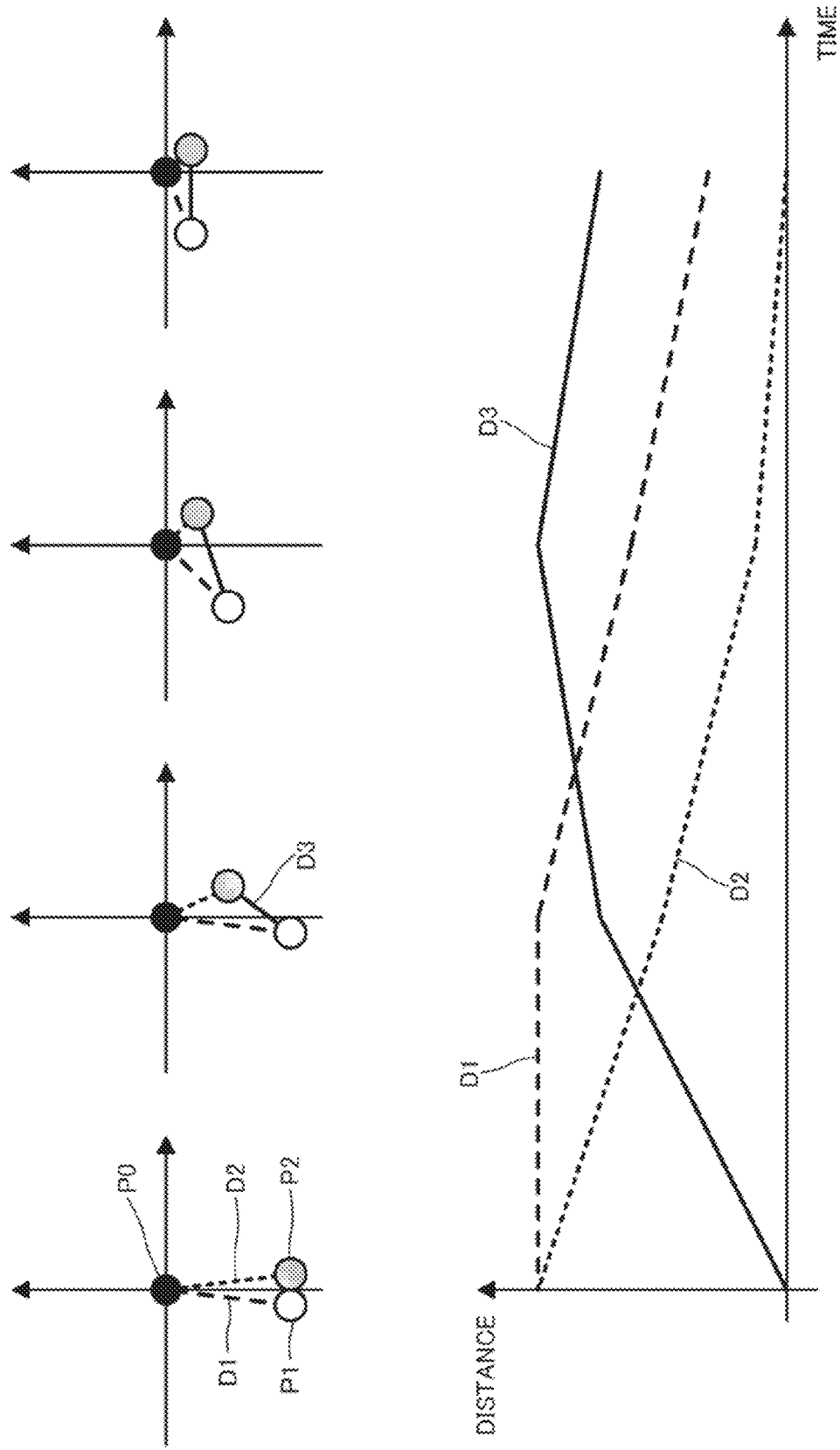
FIG. 3 is a view showing how processing is performed by the monitoring device disclosed in FIG. 1.

Then, the suspicious person identification part 13 identifies a suspicious person or a suspicious person group from the result of extraction of the actions of the potential victim P0 and the correlated persons P1 and P2 forming a person group. For example, suspicious person criteria information representing criteria for identifying a suspicious group is stored with respect to the result of extraction of the actions in the suspicious person criteria information storage part 16, the suspicious person criteria information is compared with the result of extraction of the actions, and thereby a suspicious person or a suspicious person group is identified. As an example, a case where change of distances between the respective persons P0, P1, and P2 is obtained as the result of extraction of the actions as shown in FIG. 3 will be described. An upper view of FIG. 3 shows distances between the respective persons P0, P1, and P2, and shows that time passes from left to right. A lower view of FIG. 3 shows temporal change of distances between the respective persons P0, P1, and P2. For example, it is assumed that, as shown in FIG. 3, distances D1 and D2 between the potential victim P0 and the respective correlated persons P1 and P2 forming a person group fall within a given range and change so as to gradually get short, and a distance D3 between the correlated persons P1 and P2 forming a person group falls within a given range. In this case, if the result of extraction of the actions agrees with the suspicious person criteria information, the person group including the persons P1 and P2 is identified as a suspicious person group.

In the above description, the suspicious person identification part 13 identifies a suspicious person group when the result of extraction of the actions agrees with the suspicious person criteria information. However, the suspicious person identification part 13 is not necessarily limited to identifying a suspicious person group when the extraction result agrees with the suspicious person criteria information. For example, the suspicious person identification part 13 may identify, as a suspicious person group, a person group that the aspect of change of a distance shown by the suspicious group criteria information is similar to the aspect of change of the extracted distance. Moreover, changes of distances between the respective persons are focused on in the above description. However, a suspicious person group may be identified based on similarity between a model as the suspicious person criteria information obtained by unifying changes of distances between a plurality of persons and information obtained by unifying changes of the extracted distances.

Further, the suspicious person identification part 13 may calculate the degree of correlation between the correlated persons P1 and P2 who are correlated to the potential victim P0, for example, who are located within a given range of distance from the potential victim P0, and identify a suspicious person group depending on the degree of correlation. For example, the suspicious person identification part 13 calculates a degree of correlation Y between the correlated persons P1 and P2 located within a given range of distance from the potential victim P0 in the following manner based on a coefficient (weight) set for each of actions A, B, C and D between the correlated persons P1 and P2 and based on an action time t, and notifies the degree of correlation to the output part 14:

$$Y = A*t1 + B*t2 + C*t3 + D*t4 + \ldots$$

Y: degree of correlation
A: "walking near" coefficient of action (weight)
B: "looking at (talking to) each other" coefficient of action (weight)
C: "walking at a predetermined distance" coefficient of action (weight)
D: "stop at a time" coefficient of action (weight)
t: total of times of the respective actions Then, every time a new captured image G is input, the suspicious person identification part 13 calculates position information of the correlated persons P1 and P2 taking a related action to the potential victim P0 before identification as a suspicious person as mentioned above, and information such as distances between the respective persons P0, P1, and P2 and the degree of correlation between the correlated persons P1 and P2, and notifies to the output part 14.

A method for identifying a suspicious person or a suspicious person group by the suspicious person identification part 13 may be any method. For example, a suspicious person may be identified based on, in addition to the distances between the persons described above, another action such as the lines of sight or the trajectories of movement of the correlated persons P1 and P2. For example, in a case where one correlated person P1 watches the potential victim P0 and the other correlated person P2 looks around, the correlated persons P1 and P2 may be identified as a suspicious person group. Moreover, by preparing a model that a given action is taken when the distance between persons is equal to or less than a given value as the suspicious person criteria information, a suspicious person group may be identified based on the degree of similarity between the model and the extracted information. Moreover, as described above, actions such that the correlated persons P1 and P2 once came close to the potential victim P0 and have been away from the potential victim P0 after that or the correlated persons repeatedly come close to and leave away from the potential victim P0 may be included in the suspicious person criteria information.

Although a case where the suspicious person identification part 13 identifies a suspicious person group including a plurality of persons has been illustrated in the above example, the suspicious person identification part 13 may identify a single person as a suspicious person against the potential victim P0. For example, information such that a distance within a given range between a person and the potential victim P0 is kept for a given time period and the person stares at the potential victim P0 for a given time period is stored as the suspicious person criteria information.

Then, in a case where the action of a single person P against the potential victim P0 extracted from a captured image agrees with the suspicious person criteria information, the suspicious person identification part 13 specifies the single person as a suspicious person.

The suspicious person identification part 13 is not limited to identifying a suspicious person or a suspicious person group based on the action of a correlated person to a potential victim as described above, and may identify a suspicious person or a suspicious person group based on the attribute such as age, gender, clothes, and belongings of a correlated person. At this time, the suspicious person identification part 13 may also consider the attribute of a potential victim. For example, in a case where a potential victim is a woman and the attribute of the potential victim is holding a handbag, if a correlated person is a man and is wearing a hat and sunglasses and holding a large bag, the suspicious person identification part 13 may identify the correlated person as a suspicious person.

Further, the suspicious person identification part 13 is not limited to identifying all the persons of a person group extracted beforehand as a suspicious person group. The suspicious person identification part 13 may identify a single person or a plurality of persons as a suspicious person or suspicious persons, and may also identify a plurality of persons including the specified suspicious person(s) and another person as a suspicious person group in the end. As one example, first, based on the result of extraction of the action of at least one person among correlated persons extracted as a person group in the abovementioned manner, the person is identified as a suspicious person. Then, all the persons of the person group including the person identified as a suspicious person are identified as a suspicious person group. Moreover, as another example, the suspicious person identification part 13 identifies a suspicious person based on the result of extraction of the action of at least one person among correlated persons, and identifies a suspicious person group that also includes a person located in the vicinity of the identified suspicious person and a potential victim at the moment. At this time, when the person located in the vicinity of the identified suspicious person and the potential victim takes a specific action such as acceptance or delivery of an object with the identified suspicious person or talk with the identified suspicious person, the suspicious person identification part 13 may include the person in the suspicious person group. Moreover, as another example, when the suspicious person identification part 13 identifies a suspicious person from the result of extraction of the action of at least one person among correlated persons, the suspicious person identification part 13 identifies a suspicious person group including the identified suspicious person and a person taking a related action to the potential victim, on a captured image in the past from that moment or a captured image captured by another camera. Besides, as another example, first, regardless of the potential victim, that is, regardless of the presence/absence of the possibility of suspiciousness, any person group is previously extracted from a captured image and stored. Then, in a case where at least one person of the person group is identified as a suspicious person against the potential victim, the previously stored person group including the identified suspicious person is identified as a suspicious person group.

Further, the suspicious person identification part 13 is not necessarily limited to identifying a suspicious person or a suspicious person group against the potential victim P0 identified by the potential victim identification part 12. For example, the suspicious person identification part 13 may detect any person in the captured image G as the potential victim P0, extract the action of another person to the potential victim P0, and identify a suspicious person or a suspicious person group.

The output part 14 (display control means, notification means) controls the output device 20 so as to display a monitoring screen for a monitoring person who monitors the target place R. An example of displaying the monitoring screen controlled by the output part 14 will be described referring to FIGS. 9 to 13.

Figure 9:
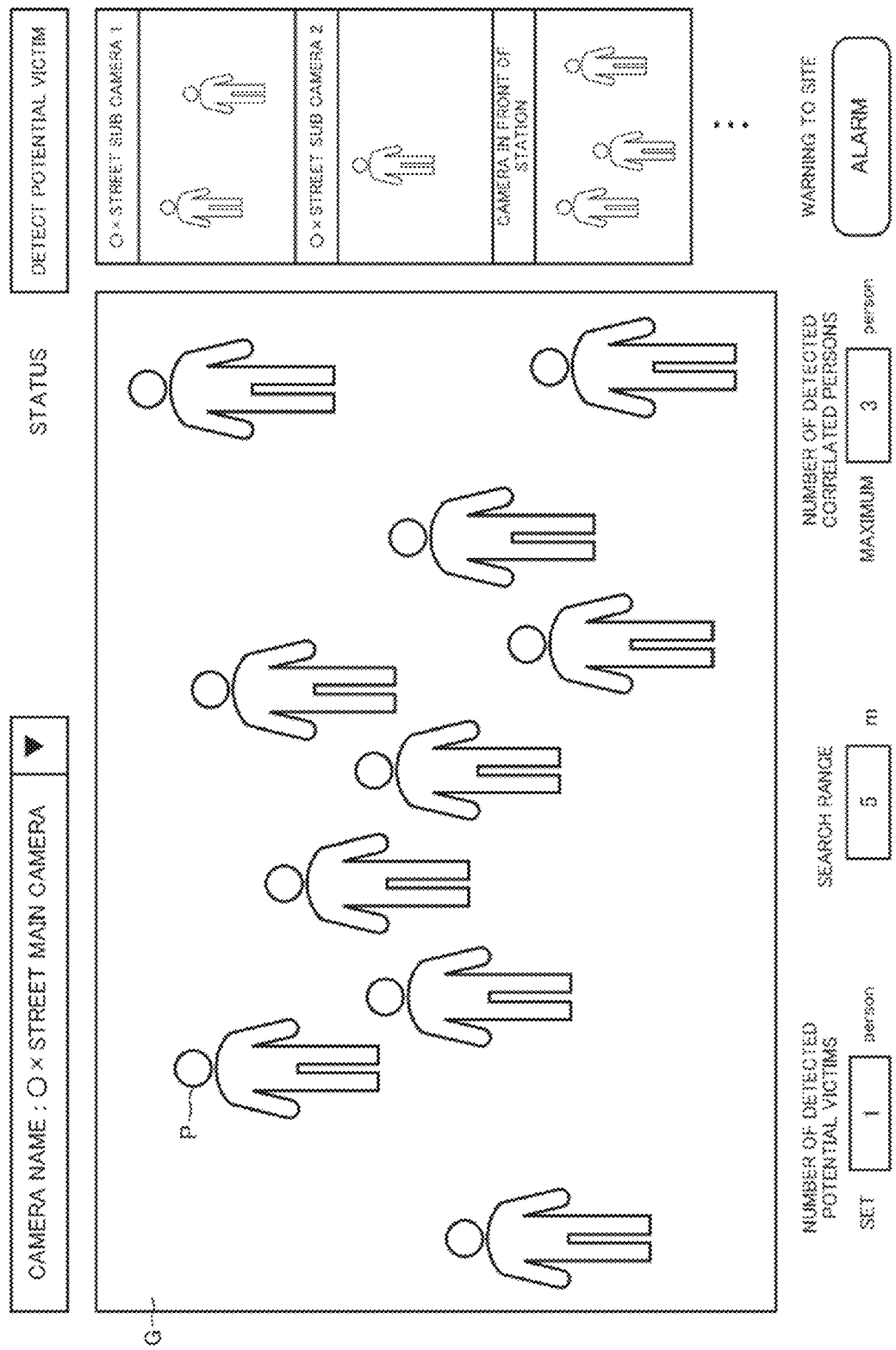
FIG. 9 is a view showing an example of information displayed on an output device disclosed in FIG. 1.

First, as shown in FIG. 9, the output part 14 displays the captured image G captured by the camera C installed in the target place R, on the monitoring screen. Every time a new captured image G is acquired, the output part 14 updates and displays the captured image G. At this time, the output part 14 displays a selection field for selecting the target place R, namely, the camera C on the monitoring screen, and displays the captured image G captured by the selected camera C.

Further, as shown in FIG. 9, the output part 14 displays input fields "number of detected potential victims", "search range" and "number of detected correlated persons" on the monitoring screen, and notifies values input therein to each part. For example, when the output part 14 notifies the "number of detected potential victims" to the potential victim identification part 12, the potential victim identification part 12 thereby detects the notified number of potential victims P0. Moreover, the output part 14 notifies the "search range" and the "number of detected correlated persons" to the suspicious person identification part 13. With this, the suspicious person identification part 13 extracts the actions of the notified number of correlated persons in the notified search range around the potential victim P0, and identifies a suspicious person or a suspicious person group from among them.

Figure 10:
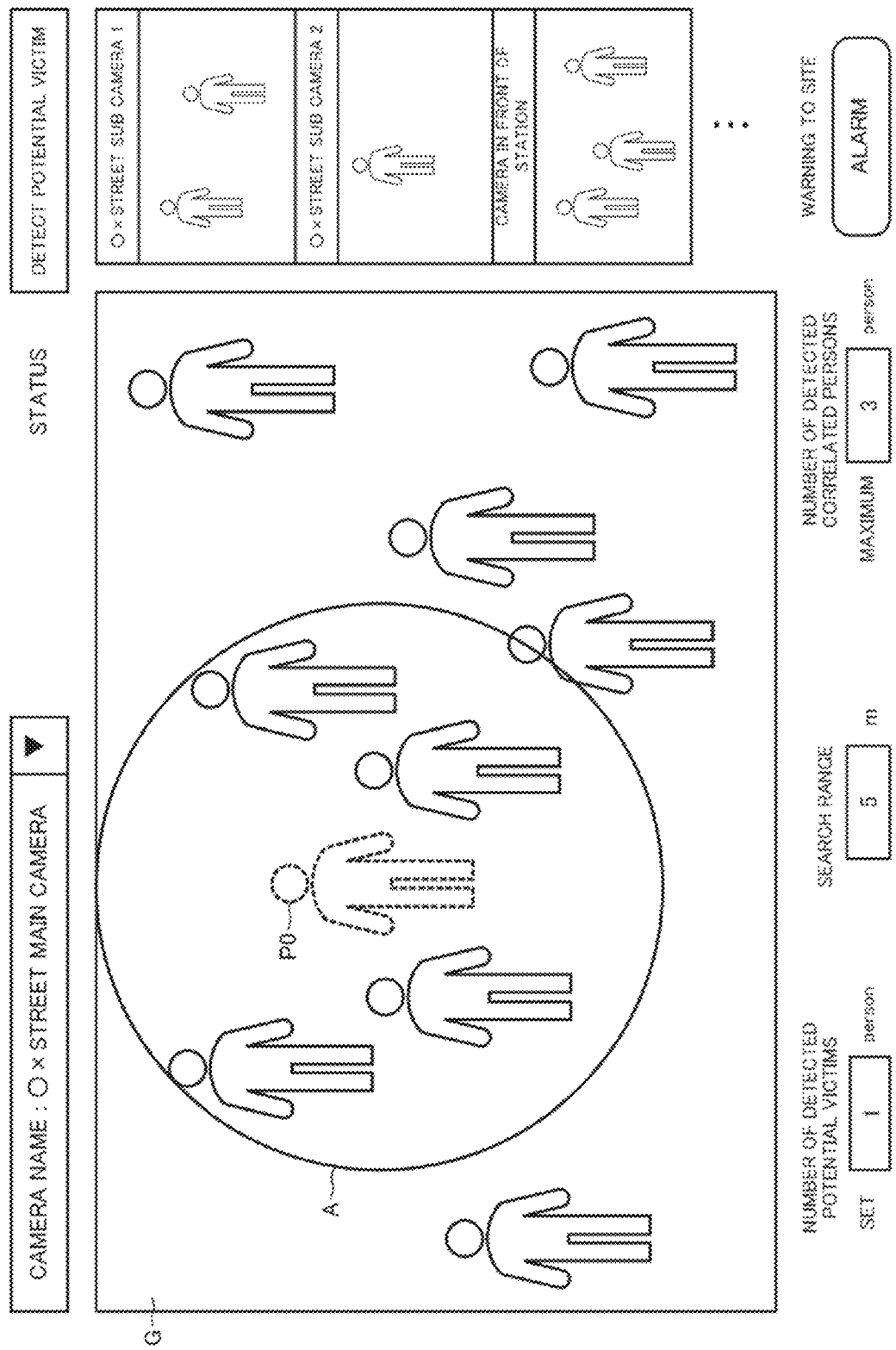
FIG. 10 is a view showing an example of information displayed on the output device disclosed in FIG. 1.

Further, upon receiving notification of position information of the potential victim P0 detected by the potential victim identification part 12 in the abovementioned manner, as shown in FIG. 10, the output part 14 displays a person portion of the potential victim P0 on the captured image G in a preset display mode for potential victim. For example, in FIG. 10, a person portion of the potential victim P0 is illustrated by dotted line, but a person portion of the potential victim P0 is displayed in the display mode for potential victim, for example, displaying by edging the surroundings of a person part in a position of the position information notified by the potential victim identification part 12, or displaying a mark representing a potential victim at the upper part of the person part.

Further, while displaying the potential victim P0 described above, the output part 14 also displays a circle representing a processing region A where the action of another person around the potential victim 0 is extracted. For example, the output part 14 displays, as the processing region A, a circle that has a radius set as a search range by the monitoring person, around the potential victim P0. With this, in the circle representing the processing region A, the potential victim P0 and a suspicious person or a suspicious person group are contained as will be described later. The circle as the processing region A is displayed in a manner that every time the potential victim P0 moves, the circle moves with the position of the potential victim P0. However, the processing region A may have any shape, and is not necessarily limited to a region around the potential victim P0.

Figure 11:
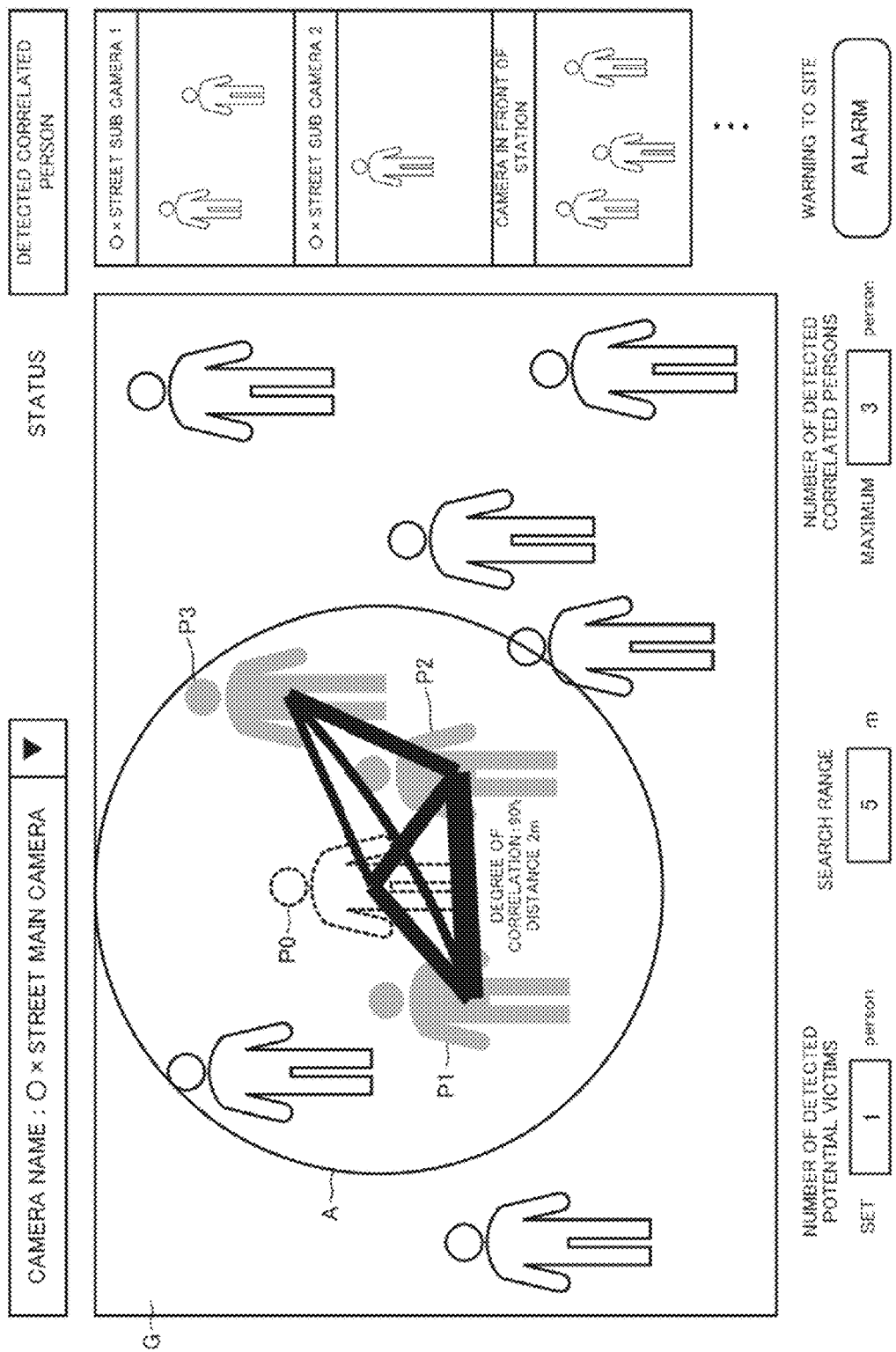
FIG. 11 is a view showing an example of information displayed on the output device disclosed in FIG. 1.

Further, upon receiving notification of correlated persons P1, P2 and P3 taking related actions to the potential victim P0 detected by the suspicious person identification part 13 in the abovementioned manner, the output part 14 displays a person portion on the captured image G in a preset display mode for correlated person as shown in FIG. 11. For example, person portions of the correlated persons P1, P2, and P3 are drawn in gray in FIG. 11. However, the output part 14 may display in the display mode for correlated person, for example, by edging the surroundings of a person part in a position of the position information notified by the suspicious person identification part 13, or displaying a mark representing a correlated person in the upper part of the person part.

Further, while displaying the correlated persons P1, P2, and P3 in the abovementioned manner, the output part 14 also displays correlation information representing a correlation between the respective persons P0, P1, P2, and P3. For example, the output part 14 displays correlation information using a strip-shaped figure connecting persons and a numerical value as shown in FIG. 11. At this time, the correlation information is, for example, a distance between the potential victim P0 and each of the correlated persons P1, P2, and P3, and a distance and a degree of correlation Y between the respective correlated persons P1, P2, and P3. In the case of displaying the correlation information using a strip-shaped figure, the output part 14 displays in a display mode corresponding to the level (strength) of a correlation, for example, displays in thickness corresponding to the value of the distance or degree of correlation. For example, in a case where a distance between persons is short or the degree of correlation between persons is high, the level of a correlation is high, so that the output part 14 displays a strip-shaped figure thick and displays a high numerical value. On the other hand, in a case where a distance between persons is long or the degree of correlation between persons is low, the level of a correlation is low, so that the output part 14 displays a strip-shaped figure thin and displays a low numerical value.

Further, the output part 14 displays the abovementioned correlation information between the respective persons in time series in which the correlation has occurred. For example, when the correlation information displayed between the persons is selected by the monitoring person, for example, by putting the mouse over, the output unit 14 displays the time when the correlation between the persons P1 and P2 has occurred and the details of the action in time series as shown by reference numeral B in FIG. 12.

Figure 13A:
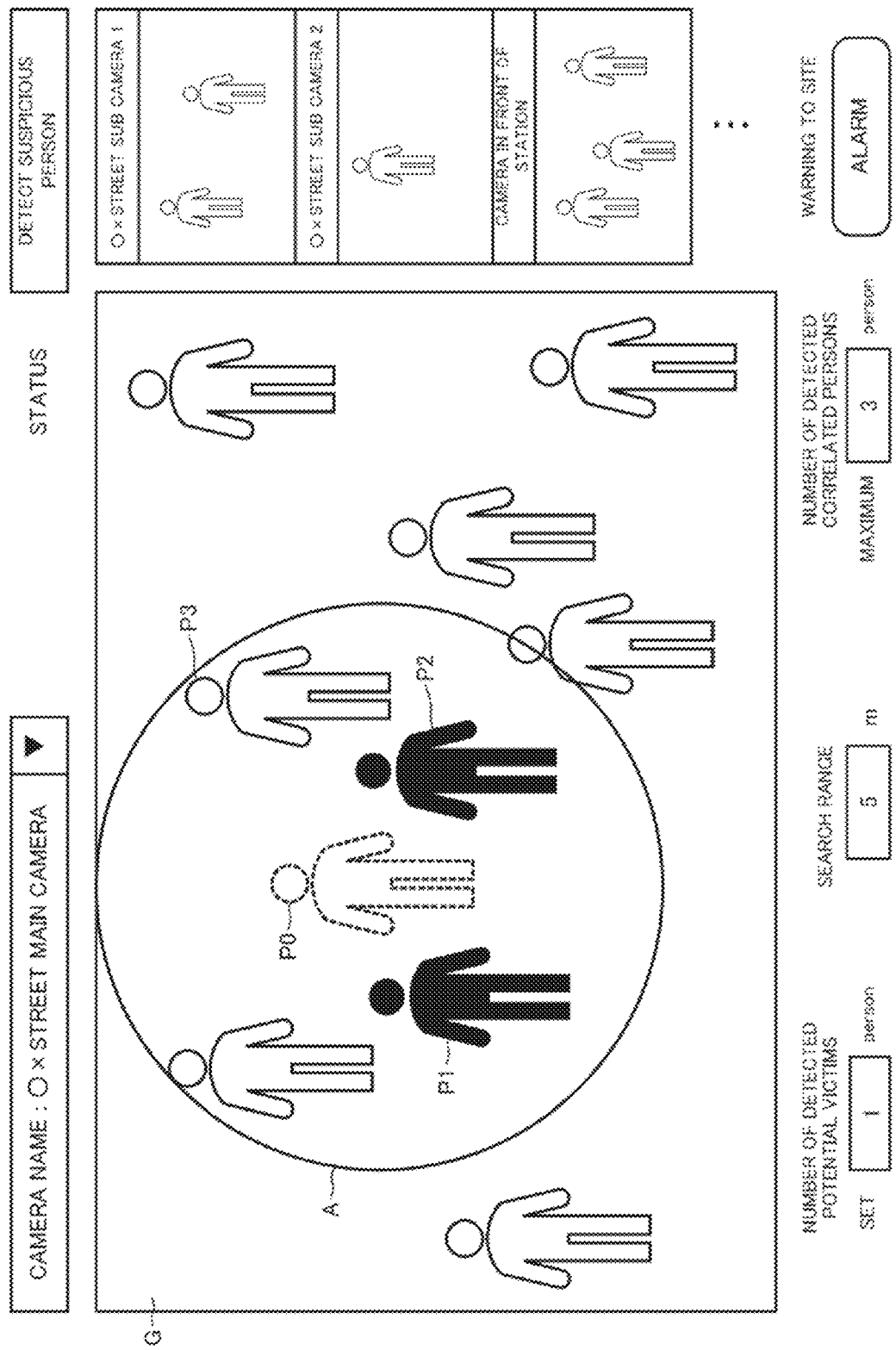
FIG. 13A is a view showing an example of information displayed on the output device disclosed in FIG. 1.
Figure 14:
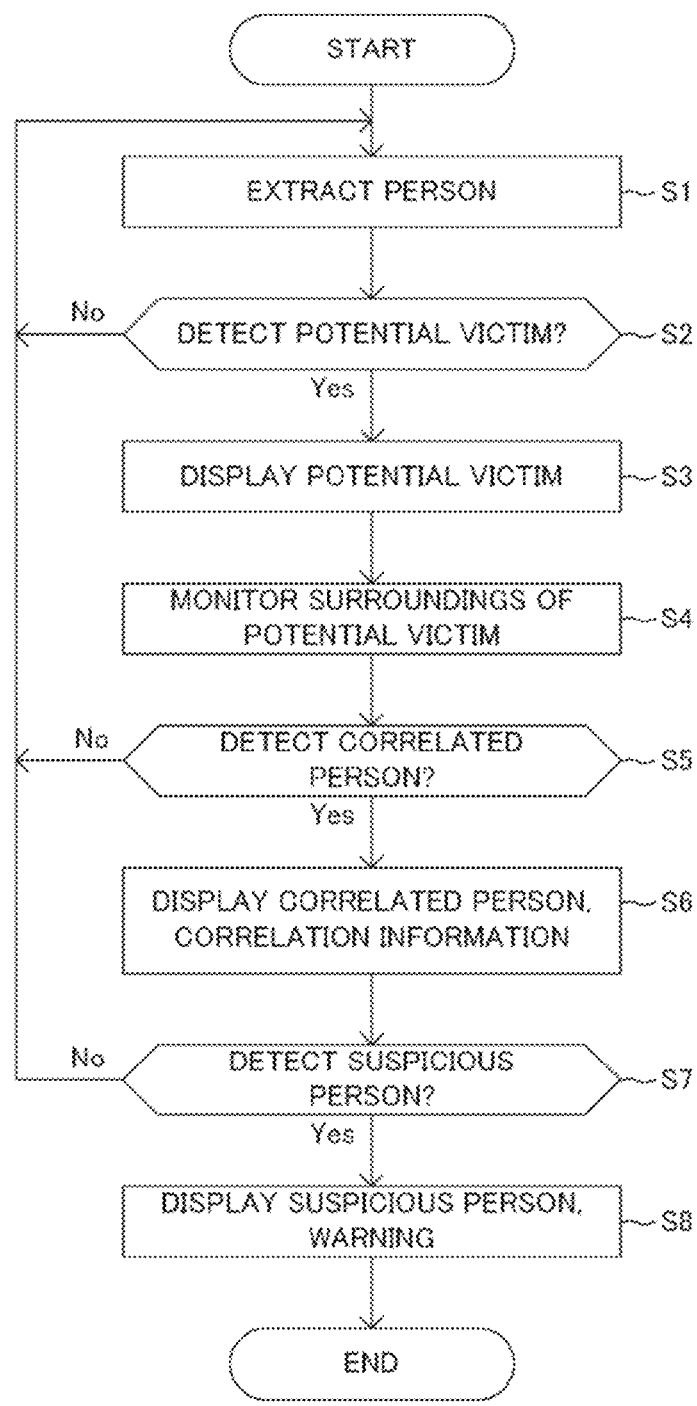
FIG. 14 is a flowchart showing a processing operation by the monitoring device disclosed in FIG. 1.

Further, upon receiving notification of a suspicious person group identified by the suspicious person identification part 13 in the abovementioned manner, the output part 14 displays a person portion on the captured image G in a preset display mode for displaying a suspicious person as shown in FIG. 13A. For example, in FIG. 13A, person portions of the suspicious persons P1 and P2 forming the identified suspicious person group is illustrated in black. However, person portions of the suspicious persons P1 and P2 may be displayed in the display mode for suspicious person, for example, displayed by edging the surroundings of a person part in a position of the position information notified by the suspicious person identification part 13, or displayed by using a mark representing a suspicious person in the upper part of the person part.

Figure 13C:
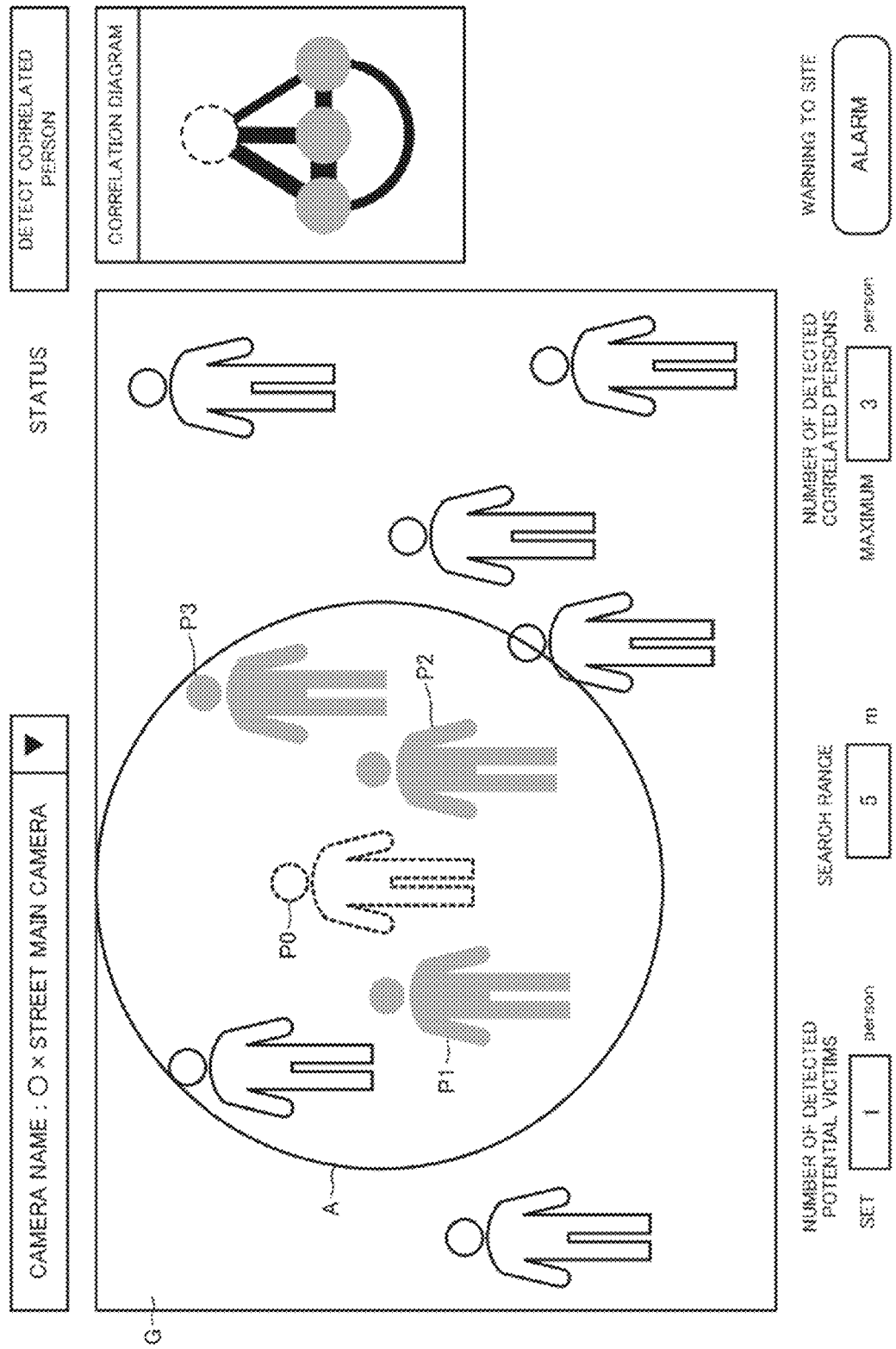
FIG. 13C is a view showing an example of information displayed on the output device disclosed in FIG. 1.

Further, the output part 14 may display the identified suspicious person group as one object denoted by reference numeral P10 as shown in FIG. 13B. In addition, correlation information formed by, for example, a strip-shaped figure as described above may be displayed between the potential victim P0 and the object P10 representing the suspicious person group. At this time, as shown in FIG. 13B, the persons P1 and P2 of the suspicious person group may be displayed together with the object P10 representing the suspicious person group, or only the object P10 may be displayed without showing the persons P1 and P2. Furthermore, as shown on the right side from the captured image G in FIG. 13C, the output part 14 may display a correlation diagram that shows correlation information representing a correlation between the respective persons including the potential victim P0 and the correlated persons P1, P2, and P3, apart from the captured image G. In the example of FIG. 13C, the correlation diagram shows simple person figures representing the potential victim P0 and the correlated persons P1, P2, and P2 and correlation information connecting the simple person figures by strip-shaped figures. The correlation diagram is not necessarily limited to being displayed on the same screen as the screen for displaying the captured image G, and may be displayed on a screen other than the screen for displaying the captured image.

Further, upon receiving notification of the suspicious person group identified by the suspicious person identification part 13 in the abovementioned manner, the output part 14 may notify existence of the suspicious person group to the potential victim P0. For example, in a case where a person is identified from a face image of the potential victim P0 and the person is a person previously registered in the monitoring device 10, the output part 14 notifies existence of the suspicious person group by sending a warning message to a previously registered address of a mobile terminal of the person. The output part 14 may notify existence of a suspicious person group by any method, for example, by outputting warning information through a speaker installed in the target place R.

The information processing system may include a plurality of cameras C, and the respective cameras C may capture images of a plurality of target places R, respectively. Then, the monitoring device 10 may identify a criminal or a criminal group in the abovementioned manner on different captured images of the target place R captured by the plurality of cameras C. Moreover, the monitoring device 10 may extract the same person from the plurality of captured images captured by the plurality of cameras C, and track the person. For example, the monitoring device extracts the same person by performing face authentication or whole-body authentication of persons shown in the captured images captured by the respective cameras C, and tracks the same person. Then, the result of tracking the person may be used for extraction of the action of a person or extraction of a person group as described above, or may be used for other processing.

[Operation]

Next, the operation of the above information processing device will be described referring to a flowchart of FIG. 14 mainly. In the following, the operation of the monitoring device 10 will be mainly described.

First, upon acquiring a captured image of the target place R captured by the camera C, as shown in FIG. 9, the monitoring device 10 displays and outputs the captured image G to the output device 20, and also extracts the person P in the captured image (step S1 in FIG. 14). At this time, the monitoring device 10 accepts an input of setting information such as the number of detected potential victims from the monitoring person and sets the information.

Then, the monitoring device 10 extracts the attribute and action of a person, the surrounding environment, and so on, from an image portion of the person P extracted from the captured image, and detects the potential victim P0 based on the information (Yes at step S2 in FIG. 14). The monitoring device 10 may generate a potential victim model representing a feature such as the attribute of a potential victim, who is easy to become a victim, from a captured image beforehand, and detect the potential victim P0 using the potential victim model and the attribute and so on of the person extracted from the captured image. However, the monitoring device 10 may detect any person on the captured image as the potential victim P0. Then, the monitoring device 10 displays the detected potential victim P0 on the captured image G as shown in FIG. 10 (step S3 in FIG. 14).

Subsequently, the monitoring device 10 sets, on the captured image G, the processing region A with a given radius around the position of the potential victim P0, and extracts the actions of persons in the processing region A (step S4 in FIG. 14). At this time, the monitoring device 10 displays, on the captured image G, the processing region A where the actions of the persons are extracted around the potential victim P0, as indicated by reference numeral A in FIG. 10.

Subsequently, the monitoring device 10 extracts the actions of the persons in the processing region A, and detects the correlated persons P1, P2, and P3 who have correlations with the potential victim P0 (Yes at step S5 in FIG. 14). For example, the monitoring device 10 detects persons taking a given action such as being located within a given range of distance from the potential victim P0, as the correlated persons P1, P2, and P3. In addition, the monitoring device extracts correlations between the potential victim P0 and the respective correlated persons P1, P2, and P3, and correlations between the respective correlated persons P1, P2, and P3. For example, the monitoring device 10 calculates a distance between persons as the correlation information, or calculates the degree of correlation by quantifying specific actions between persons and totaling them by a preset formula, as the correlation information.

Figure 12:
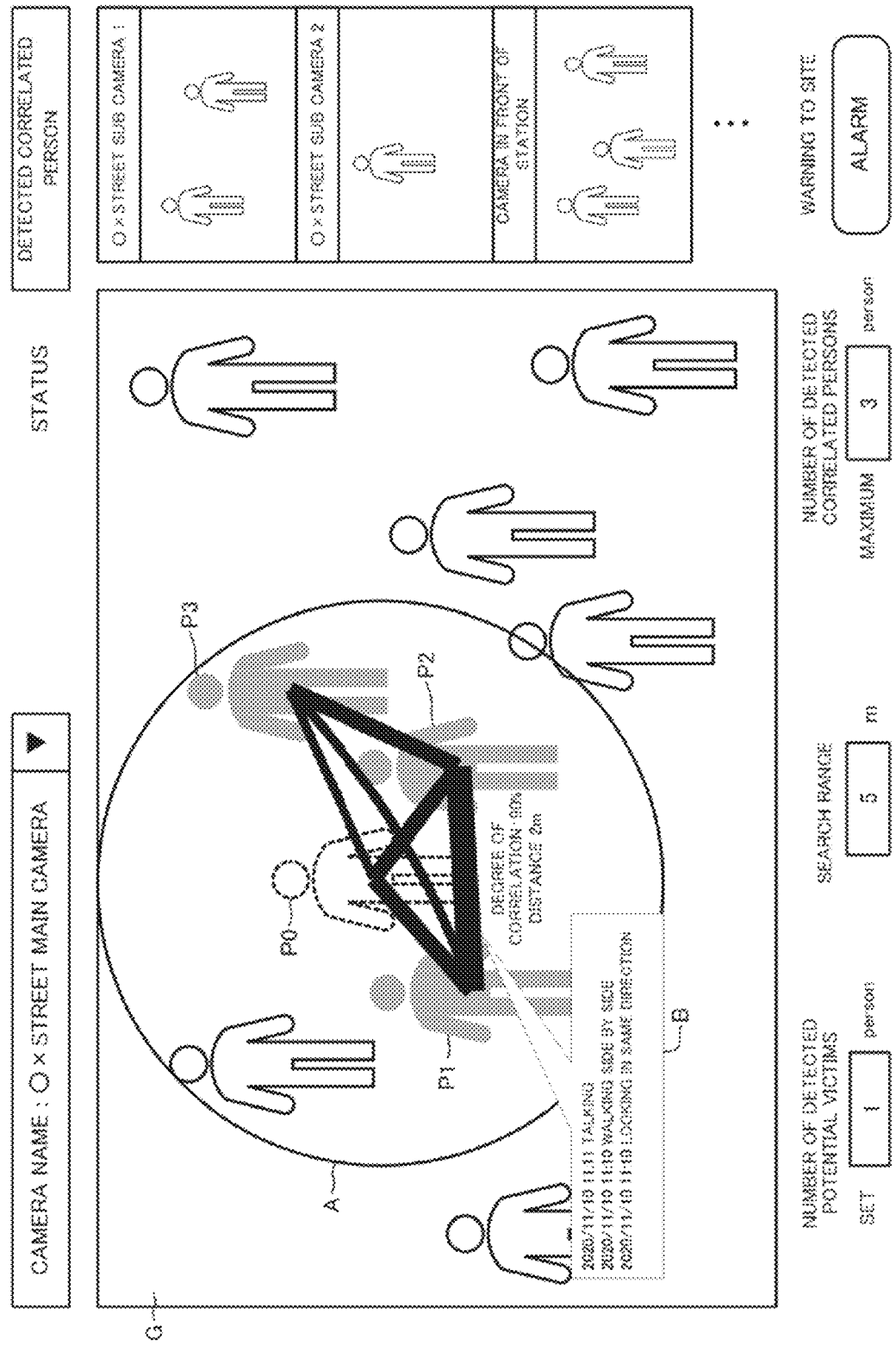
FIG. 12 is a view showing an example of information displayed on the output device disclosed in FIG. 1.

Subsequently, as shown in FIGS. 11 and 12, on the captured image, the monitoring device displays the detected correlated persons P1, P2, and P3 and also displays the correlation information between the respective persons (step S6 in FIG. 14). As the correlation information, the monitoring device 10 displays, for example, strip-shaped figures that vary in thickness depending on the level of correlation, numerical values, and the details of actions.

Then, the monitoring device 10 identifies a single suspicious person or a suspicious person group including a plurality of suspicious persons from the correlated persons P1, P2, and P3 based on the correlations between the respective persons (Yes at step S7 in FIG. 14). For example, in the case shown in FIG. 13A, the monitoring device 10 identifies a suspicious person group including two correlated persons P1 and P2. The monitoring device 10 displays the suspicious persons P1 and P2 forming the identified suspicious person group on the captured image as shown in FIG. 13A, and also performs notification processing such as giving warnings to various places (step S8 in FIG. 14).

As described above, according to the present invention, the actions of the correlated persons P1, P2, and P3 who have correlations to the potential victim P0 are extracted from the captured image G of the target place R, and thereby the suspicious persons P1 and P2 (suspicious person group) against the potential victim P0 is identified. With this, even in a crowd where a plurality of persons exist, it is possible to identify a suspicious person who may commit a crime or a nuisance, and it is possible to take an action so as to prevent a crime and a nuisance.

Further, according to the present invention, correlations between persons such as the potential victim P0 and the correlated persons P1, P2, and P3 are detected, and the correlation information is displayed and output together with a person image. With this, even when a suspicious person identified in the abovementioned manner exists in a crowd, it is possible to easily recognize the suspicious person. As a result, it is possible to take an action so as to prevent a crime and a nuisance.

Although a case of identifying the suspicious persons P1 and P2 against the potential victim P0 has been illustrated above, the potential victim P0 may be any person, and the suspicious persons P1 and P2 may also be any persons. That is to say, the present invention can also be used for a case of identifying any person having a correlation to a certain person, not limited to the case of identifying a suspicious person against a certain person.

Second Example Embodiment

Figure 15:
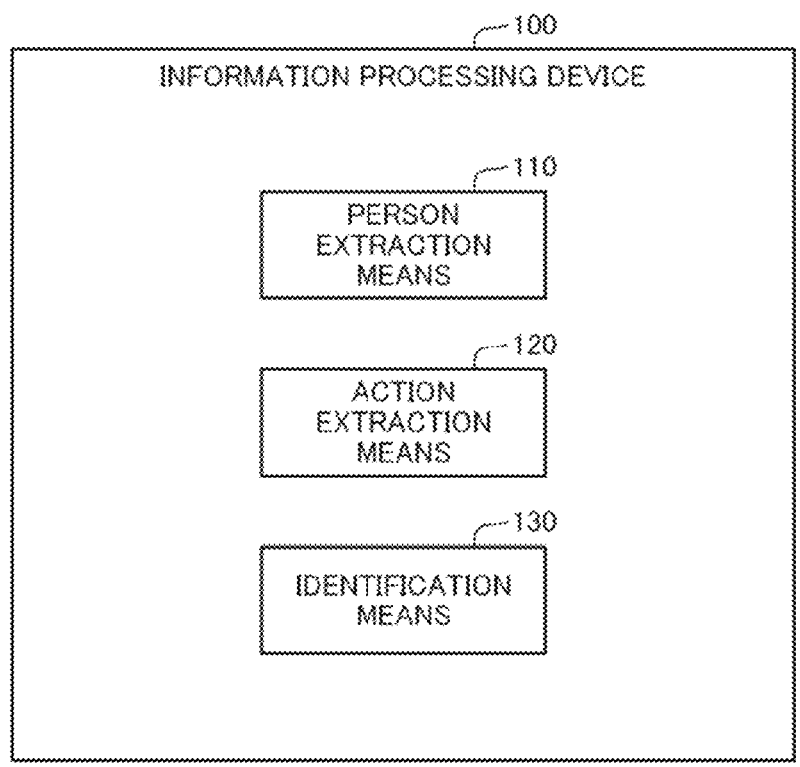
FIG. 15 is a block diagram showing the configuration of an information processing device according to a second example embodiment of the present invention.

Next, a second example embodiment of the present invention will be described referring to FIG. 15. FIG. 15 is a block diagram showing the configuration of an information processing device in the second example embodiment. In this example embodiment, the overview of the configuration of the monitoring device described in the first example embodiment is shown.

As shown in FIG. 15, an information processing device 100 in this example embodiment includes: a person extraction means 110 that extracts a person in a captured image; an action extraction means 120 that extracts an action of a person group including a plurality of other persons against a given person in the captured image; and an identification means 130 that identifies a given person group based on a result of extracting the action of the person group.

The person extraction means 110, the action extraction means 120, and the identification means 130 that are described above may be constructed by execution of a program by an arithmetic logic unit of the information processing device 100, or may be constructed by an electronic circuit.

Then, the information processing device 100 with the above configuration operates so as to: extract a person in a captured image; extract an action of a person group including a plurality of other persons against a given person in the captured image; and identify a given person group based on a result of extracting the action of the person group.

According to the present invention, it is possible to identify a given person group from the action of the person group including a given person. With this, it is possible to identify a desired person such as a suspicious group that may commit a crime or a nuisance even in a crowd where a plurality of persons exist.

Third Example Embodiment

Figure 16:
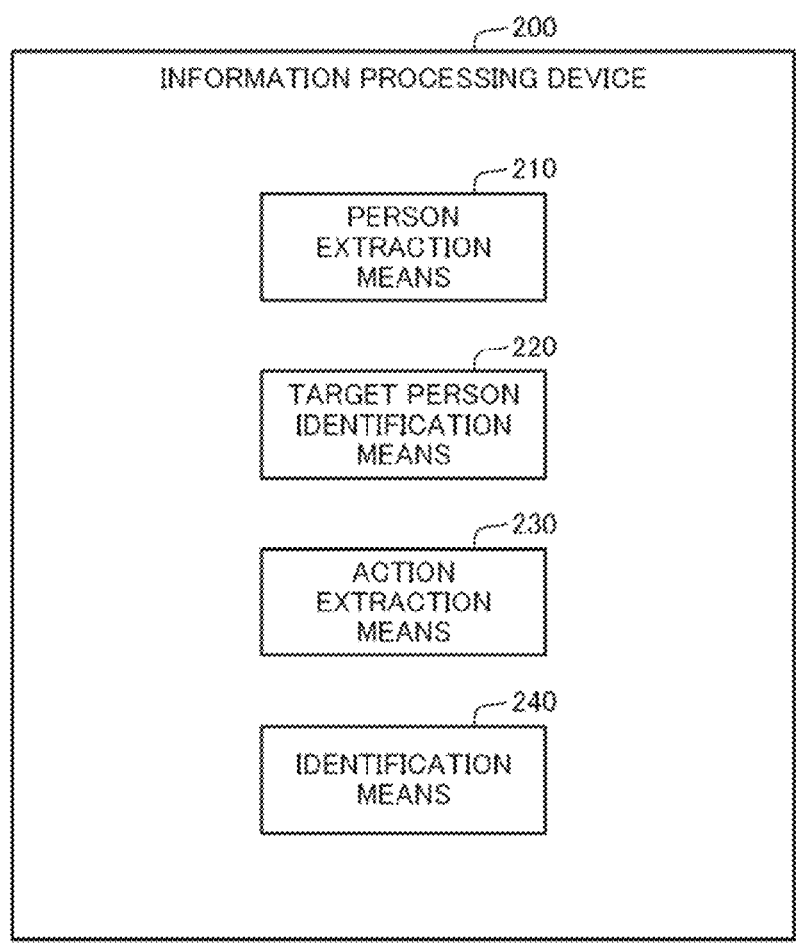
FIG. 16 is a block diagram showing the configuration of an information processing device according to a third example embodiment of the present invention.

Next, a third example embodiment of the present invention will be described referring to FIG. 16. FIG. 16 is a block diagram showing the configuration of an information processing device in the third example embodiment. In this example embodiment, the overview of the configuration of the monitoring device described in the first example embodiment.

As shown in FIG. 16, an information processing device 200 in this example embodiment includes: a person extraction means 210 that extracts a person in a captured image; a target person detection means 220 that extracts an attribute of a person in the captured image and detects a target person based on person information including the attribute of the person; an action extraction means 230 that extracts an action of another person against the target person in the captured image; and an identification means 240 that identifies a given other person based on a result of extracting the action of the other person.

Meanwhile, the person extraction means 210, the target person detection means 220, the action extraction means 230, and the identification means 240 may be constructed by execution of a program by an arithmetic logic unit included by the information processing device 200, or may be constructed by an electronic circuit.

Then, the information processing device 200 with the abovementioned configuration operates so as to: extract a person in a captured image; extract an attribute of a person in the captured image and detect a target person based on person information including the attribute of the person; extract an action of another person against the target person in the captured image; and identify a given other person based on a result of extracting the action of the other person.

According to the invention, it is possible to detect a target person from the attribute of a person in a captured image, and identify a given other person from the action of the other person against the target person. Therefore, even in a crowd where a plurality of persons exist, it is possible to identify a desired person such as a suspicious person who might commit a crime or a nuisance against the target person.

Fourth Example Embodiment

Figure 17:
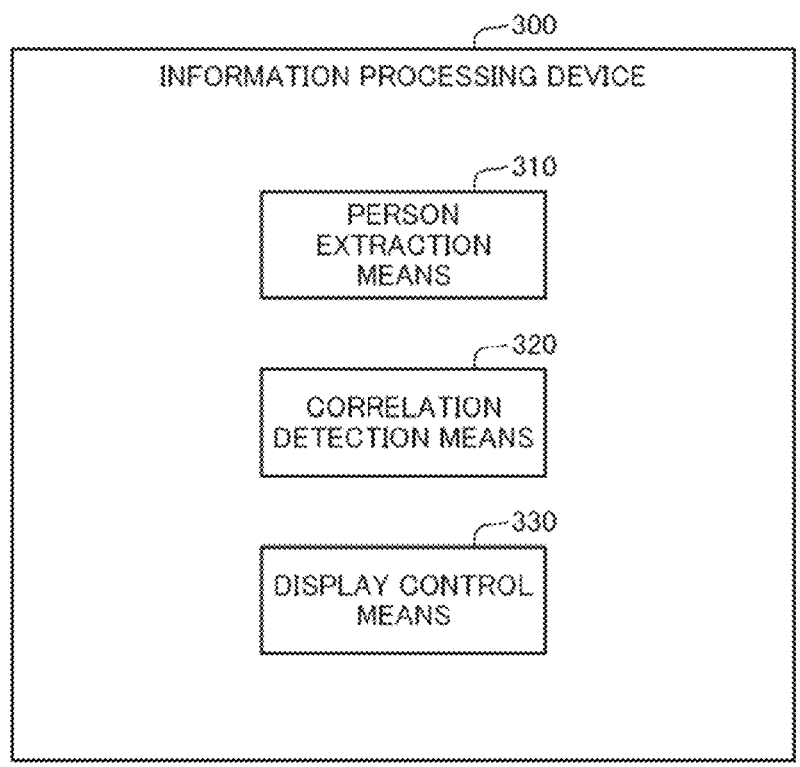
FIG. 17 is a block diagram showing the configuration of an information processing device according to a fourth example embodiment of the present invention.

Next, a fourth example embodiment of the present invention will be described referring to FIG. 17. FIG. 17 is a block diagram showing the configuration of an information processing device in the fourth example embodiment. In this example embodiment, the overview of the configuration of the monitoring device described in the first example embodiment will be shown.

As shown in FIG. 17, an information processing device 300 in this example embodiment includes: a person extraction means 310 that extracts a person in a captured image; a correlation detection means 320 that detects a correlation between a plurality of persons based on the captured image; and a display control means 330 that controls to display correlation information representing the correlation between the plurality of persons together with a person image corresponding to the person in the captured image.

The person extraction means 310, the cooperation detection means 320, and the display control means 330 may be constructed by execution of a program by an arithmetic logic unit included by the information processing device 300, or may be constructed by an electronic circuit.

Then, the information processing device 300 with the above configuration operates so as to: extracting a person in a captured image; detecting a correlation between a plurality of persons based on the captured image; and controlling to display correlation information representing the correlation between the plurality of persons together with a person image corresponding to the person in the captured image.

According to the present invention, firstly, a correlation between persons in a captured image is detected, and correlation information is displayed together with a person image. Therefore, it is possible to easily recognize a correlation of a desired person such as a suspicious person who might commit a crime or a nuisance against a given person in a crowd where a plurality of persons exist.

<Supplementary Notes>

The whole or part of the example embodiments disclosed above can be described as in the following supplementary notes. Below, the overview of the configurations of the information processing device, the information processing method and the program according to the present invention will be described. However, the present invention is not limited to the following configurations.

(Supplementary Note 1)

An information processing device comprising:
- a person extraction means that extracts a person in a captured image;
- an action extraction means that extracts an action of a person group including a plurality of other persons against a given person in the captured image; and
- an identification means that identifies a given person group based on a result of extracting the action of the person group.

(Supplementary Note 2)

The information processing device according to Supplementary Note 1, wherein the identification means identifies the person group as the given person group in a case where the respective persons included by the person group take related actions against the given person.

(Supplementary Note 3)

The information processing device according to Supplementary Note 2, wherein the identification means identifies the person group as the given person group in a case where the respective persons included by the person group take related actions against the given person and the respective persons included by the person group also take mutually related actions.

(Supplementary Note 4)

The information processing device according to any of Supplementary Notes 1 to 3, wherein the identification means identifies the given person group based on distances of the respective persons included by the person group to the given person.

(Supplementary Note 5)

The information processing device according to Supplementary Note 4, wherein the identification means identifies the given person group based on distances of the respective persons included by the person group to the given person and also based on distances between the respective persons included by the person group.

(Supplementary Note 6)

The information processing device according to any of Supplementary Notes 1 to 5, wherein the action extraction means extracts the action of the person group including the other persons located in a given distance range to the given person.

(Supplementary Note 7)

The information processing device according to any of Supplementary Notes 1 to 6, comprising a target person detection means that extracts an attribute of a person in the captured image and detects the given person based on person information including the attribute of the person.

(Supplementary Note 8)

The information processing device according to Supplementary Note 7, comprising a criteria information generation means that generates criteria information representing an attribute of a person to be detected as the given person based on a past captured image,
wherein the target person detection means detects the given person based on the criteria information and the extracted attribute of the person.

(Supplementary Note 9)

The information processing device according to Supplementary Note 7, wherein the target person detection means extracts an environment in the captured image and detects the given person based on the extracted environment and the extracted attribute of the person.

(Supplementary Note 10)

The information processing device according to Supplementary Note 9, comprising a criteria information generation means that generates criteria information representing an attribute of a person to be detected as the given person and an environment in the captured image including the person based on a past captured image,
wherein the target person detection means detects the given person based on the criteria information, the extracted attribute of the person, and the extracted environment.

(Supplementary Note 11)

A computer program comprising instructions for causing an information processing device to realize:
a person extraction means that extracts a person in a captured image;
an action extraction means that extracts an action of a person group including a plurality of other persons against a given person in the captured image; and
an identification means that identifies a given person group based on a result of extracting the action of the person group.

(Supplementary Note 12)

An information processing method comprising:
extracting a person in a captured image;
extracting an action of a person group including a plurality of other persons against a given person in the captured image; and
identifying a given person group based on a result of extracting the action of the person group.

(Supplementary Note 13)

The information processing method according to Supplementary Note 12, comprising:
extracting an attribute of a person in the captured image and detecting the given person based on person information including the attribute of the person.

(Supplementary Note 14)

The information processing method according to Supplementary Note 13, comprising:
generating criteria information representing an attribute of a person to be detected as the given person based on a past captured image; and
detecting the given person based on the criteria information and the extracted attribute of the person.

(Supplementary Note 15)

The information processing method according to Supplementary Note 14, comprising:
extracting an environment in the captured image and detecting the given person based on the extracted environment and the extracted attribute of the person.

(Supplementary Note 2-1)

An information processing device comprising:
a person extraction means that extracts a person in a captured image;
a target person detection means that extracts an attribute of a person in the captured image and detects a target person based on person information including the attribute of the person;
an action extraction means that extracts an action of another person against the target person in the captured image; and
an identification means that identifies a given other person based on a result of extracting the action of the other person.

(Supplementary Note 2-2)

The information processing device according to Supplementary Note 2-1, comprising a criteria information generation means that generates criteria information representing an attribute of a person to be detected as the target person based on a past captured image,
wherein the target person detection means detects the target person based on the criteria information and the extracted attribute of the person.

(Supplementary Note 2-3)

The information processing device according to Supplementary Note 2-1, wherein the target person detection means extracts an environment in the captured image and detects the target person based on the extracted environment and the extracted attribute of the person.

(Supplementary Note 2-4)

The information processing device according to Supplementary Note 2-3, comprising a criteria information generation means that generates criteria information representing an attribute of a person to be detected as the target person and an environment in the captured image including the person based on a past captured image,
wherein the target person detection means detects the target person based on the criteria information, the extracted attribute of the person, and the extracted environment.

(Supplementary Note 2-5)

The information processing device according to any of Supplementary Notes 2-1 to 2-4, wherein the identification means identifies the other person as the given other person in a case where the other person takes a given action against the target person.

(Supplementary Note 2-6)

The information processing device according to any of Supplementary Notes 2-1 to 2-5, wherein the identification means identifies the given other person based on a distance of the other person to the target person.

(Supplementary Note 2-7)

The information processing device according to any of Supplementary Notes 2-1 to 2-6, wherein:
the action extraction means extracts an action of a person group including a plurality of other persons against the target person in the captured image; and
the identification means identifies the person group as a given person group in a case where the respective persons included by the person group take mutually related actions against the target person.

(Supplementary Note 2-8)

The information processing device according to Supplementary Note 2-7, wherein the identification means identifies the given person group based on distances of the respective persons included by the person group to the target person.

(Supplementary Note 2-9)

The information processing device according to Supplementary Note 2-8, wherein the identification means identifies the given person group based on distances of the respective persons included by the person group to the target person and also based on distances between the respective persons included by the person group.

(Supplementary Note 2-10)

The information processing device according to any of Supplementary Notes 2-1 to 2-9, wherein the action extraction means extracts the action of the other person located in a given distance range to the target person.

(Supplementary Note 2-11)

A computer program comprising instructions for causing an information processing device to realize:
- a person extraction means that extracts a person in a captured image;
- a target person detection means that extracts an attribute of a person in the captured image and detects a target person based on person information including the attribute of the person;
- an action extraction means that extracts an action of another person against the target person in the captured image; and
- an identification means that identifies a given other person based on a result of extracting the action of the other person.

(Supplementary Note 2-12)

An information processing method comprising:
- extracting a person in a captured image;
- extracting an attribute of a person in the captured image and detecting a target person based on person information including the attribute of the person;
- extracting an action of another person against the target person in the captured image; and
- identifying a given other person based on a result of extracting the action of the other person.

(Supplementary Note 2-13)

The information processing method according to Supplementary Note 2-12, comprising:
- generating criteria information representing an attribute of a person to be detected as the target person based on a past captured image; and
- detecting the target person based on the criteria information and the extracted attribute of the person.

(Supplementary Note 2-14)

The information processing method according to Supplementary Note 2-12, comprising:
- extracting an environment in the captured image and detecting the target person based on the extracted environment and the extracted attribute of the person.

(Supplementary Note 2-15)

The information processing method according to any of Supplementary Notes 2-12 to 2-14, comprising:
- extracting an action of a person group including a plurality of other persons against the target person in the captured image; and
- identifying the person group as a given person group in a case where the respective persons included by the person group take mutually related actions against the target person.

(Supplementary Note 3-1)

An information processing device comprising:
- a person extraction means that extracts a person in a captured image;
- a correlation detection means that detects a correlation between a plurality of persons based on the captured image; and
- a display control means that controls to display correlation information representing the correlation between the plurality of persons together with a person image corresponding to the person in the captured image.

(Supplementary Note 3-2)

The information processing device according to Supplementary Note 3-1, wherein the display control means controls to display the correlation information in a display mode corresponding to a content of the correlation between the plurality of persons.

(Supplementary Note 3-3)

The information processing device according to Supplementary Note 3-2, wherein the display control means controls to display the correlation information in a display mode corresponding to a strength of the correlation between the plurality of persons.

(Supplementary Note 3-4)

The information processing device according to Supplementary Note 3-2 or 3-3, wherein the display control means controls to display the correlation information in time series of occurrence of the correlation.

(Supplementary Note 3-5)

The information processing device according to any of Supplementary Notes 3-2 to 3-4, wherein the display control means controls to display a person who satisfies a given condition based on the correlation information, in a preset display mode.

(Supplementary Note 3-6)

The information processing device according to any of Supplementary Notes 3-2 to 3-5, wherein:
- the correlation detection means detects, based on actions of a plurality of persons in the captured image, a correlation between the persons; and
- the display control means controls to display the correlation information in a display mode corresponding to the correlation based on the actions of the plurality of persons.

(Supplementary Note 3-7)

The information processing device according to Supplementary Note 3-6, wherein:
- the correlation detection means detects, based on an action of a person group including a plurality of other persons against a given person in the captured image, a correlation between the persons included by the person group; and
- the display control means controls to display the correlation information between the persons included by the person group.

(Supplementary Note 3-8)

The information processing device according to Supplementary Note 3-6 or 3-7, wherein:
- the correlation detection means detects, based on an action of a person group including a plurality of other persons against a given person in the captured image, correlations between the given person and the persons included by the person group; and
- the display control means controls to display the correlation information between the given person and the persons included by the person group.

(Supplementary Note 3-9)

The information processing device according to Supplementary Note 3-7 or 3-8, wherein the display control means controls to display a given region including the given person and the person group having been identified, in a given display mode.

(Supplementary Note 3-10)

The information processing device according to Supplementary Note 3-9, wherein the display control means controls to display a given region including the given person and the person group having been identified with reference to a position of the given person, in a given display mode.

(Supplementary Note 3-11)

The information processing device according to any of Supplementary Notes 3-7 to 3-10, comprising:
- a person identification means that identifies the given person based on the captured image; and a notification means that notifies existence of the person group to the given person.

(Supplementary Note 3-12)

A computer program comprising instructions for causing an information processing device to realize:
  a person extraction means that extracts a person in a captured image;
  a correlation detection means that detects a correlation between a plurality of persons based on the captured image; and
  a display control means that controls to display correlation information representing the correlation between the plurality of persons together with a person image corresponding to the person in the captured image.

(Supplementary Note 3-13)

An information processing method comprising:
  extracting a person in a captured image;
  detecting a correlation between a plurality of persons based on the captured image; and
  controlling to display correlation information representing the correlation between the plurality of persons together with a person image corresponding to the person in the captured image.

The above program is stored using various types of non-transitory computer-readable mediums, and can be supplied to the computer. The non-transitory computer-readable medium includes various types of tangible recording mediums. Examples of the non-transitory computer-readable medium include a magnetic recording medium (for example, flexible disk, magnetic tape, hard disk drive, etc.), a magneto-optical recording medium (magneto-optical disk, etc.), a CD-ROM (Read Only Memory), a CD-R, a CD-R/W, and a semiconductor memory (mask ROM, PROM (Programmable ROM), EPROM (Erasable PROM), flash ROM, and RAM (Random Access Memory)). The program may be supplied to the computer by various types of transitory computer-readable mediums. Examples of the transitory computer-readable medium include an electric signal, an optical signal, and an electromagnetic wave. The transitory computer-readable medium can supply the program to the computer via a wired communication path such as an electric wire and an optical fiber, or via a wireless communication path.

Although the present invention has been described above referring to the example embodiments and so on, the present invention is not limited to the above example embodiments. The configurations and details of the present invention can be changed in various manners that can be understood by one skilled in the art within the scope of the present invention.

DESCRIPTION OF REFERENCE NUMERALS 10 monitoring device
11 person extraction part
12 potential victim identification part
13 suspicious person identification part
14 output part
15 potential victim criteria information storage part
16 suspicious person criteria storage part
20 output device
100 information processing device
110 person extraction means
120 action extraction means
130 identification means
200 information processing device
210 person extraction means
220 target person detection means
230 action extraction means
240 identification means
300 information processing device
310 person extraction means
320 correlation detection means
330 display control means
A processing region
C camera
G captured image
P person
P0 potential victim
P1, P2, P3 correlated person
R target place

The invention claimed is:

1. An information processing device comprising:
  a memory in which instructions are stored; and
  at least one processor configured to execute the instructions, wherein the instructions include:
    extracting a person in a captured image;
    on a basis of the captured image, extracting an action of a person group including a plurality of other persons located in a given distance range with respect to a given person shown in the captured image; and
    identifying the person group related to the given person based on a result of extracting the action of the person group.

2. The information processing device according to claim 1, wherein the instructions include identifying the person group as the person group related to the given person in a case where the respective persons included in the person group take related actions against the given person.

3. The information processing device according to claim 2, wherein the instructions include identifying the person group as the person group related to the given person in a case where the respective persons included by the person group take related actions against the given person and the respective persons included by the person group also take mutually related actions.

4. The information processing device according to claim 1, wherein the instructions include identifying the person group related to the given person based on distances of the respective persons included by the person group to the given person.

5. The information processing device according to claim 4, wherein the instructions include identifying the person group related to the given person based on distances of the respective persons included by the person group to the given person and also based on distances between the respective persons included by the person group.

6. The information processing device according claim 1, wherein the instructions include extracting an attribute of a person in the captured image and detecting the given person based on person information including the attribute of the person.

7. The information processing device according to claim 6, wherein the instructions include:
  generating criteria information representing an attribute of a person to be detected as the given person based on a past captured image; and
  detecting the given person based on the criteria information and the extracted attribute of the person.

8. The information processing device according to claim 6, wherein the instructions include extracting an environment in the captured image and detecting the given person based on the extracted environment and the extracted attribute of the person.

9. The information processing device according to claim 8, wherein the instructions include:
    generating criteria information representing an attribute of a person to be detected as the given person and an environment in the captured image including the person based on a past captured image; and
    detecting the given person based on the criteria information, the extracted attribute of the person, and the extracted environment.

10. A non-transitory computer-readable medium storing a program comprising instructions for causing an information processing device to execute processes of:
    extracting a person in a captured image;
    on a basis of the captured image, extracting an action of a person group including a plurality of other persons located in a given distance range with respect to a given person shown in the captured image; and
    identifying the person group related to the given person based on a result of extracting the action of the person group.

11. An information processing method comprising:
    extracting a person in a captured image;
    on a basis of the captured image, extracting an action of a person group including a plurality of other persons located in a given distance range with respect to a given person shown in the captured image; and
    identifying the person group related to the given person based on a result of extracting the action of the person group.

12. The information processing method according to claim 11, comprising:
    extracting an attribute of a person in the captured image and detecting the given person based on person information including the attribute of the person.

13. The information processing method according to claim 12, comprising:
    generating criteria information representing an attribute of a person to be detected as the given person based on a past captured image; and
    detecting the given person based on the criteria information and the extracted attribute of the person.

14. The information processing method according to claim 12, comprising:
    extracting an environment in the captured image and detecting the given person based on the extracted environment and the extracted attribute of the person.

* * * * *